United States Patent [19]
Moriya et al.

[11] Patent Number: 5,754,709
[45] Date of Patent: May 19, 1998

[54] METHOD AND APPARATUS FOR GRADATION CORRECTION AND IMAGE EDGE EXTRACTION

[75] Inventors: Michiyo Moriya, Moriguchi; Hiroshi Yamamoto, Katano; Taro Imagawa, Kadoma; Susumu Maruno, Osaka; Toshiyuki Koda, Yokohama, all of Japan

[73] Assignee: Matsushita Electric Industrial Co., Ltd., Osaka, Japan

[21] Appl. No.: 508,037

[22] Filed: Jul. 27, 1995

[30] Foreign Application Priority Data

Nov. 10, 1994 [JP] Japan ................................. 6-276451

[51] Int. Cl.$^6$ .............................. G06K 9/40; G06K 9/48; G06K 9/52; G06K 9/34
[52] U.S. Cl. .................... 382/274; 358/521; 358/458; 358/461; 358/532; 382/199; 382/206; 382/173; 382/167
[58] Field of Search ........................ 382/190, 191, 382/192, 195, 199, 206, 227, 226, 274, 288, 156, 174, 173, 270, 272, 167; 358/521, 458, 455, 460–461, 462, 532; 364/276.6, 972.4; 395/21, 126; 348/251

[56] References Cited

U.S. PATENT DOCUMENTS

| | | | |
|---|---|---|---|
| 5,018,218 | 5/1991 | Peregrim et al. | 382/272 |
| 5,206,917 | 4/1993 | Ueno et al. | 382/288 |
| 5,216,463 | 6/1993 | Morita | 355/208 |
| 5,296,919 | 3/1994 | Maruno et al. | 348/675 |
| 5,463,697 | 10/1995 | Toda et al. | 382/199 |
| 5,477,335 | 12/1995 | Tai | 358/461 |
| 5,495,350 | 2/1996 | Shimizu et al. | 358/521 |
| 5,515,181 | 5/1996 | Iyoda et al. | 358/474 |

FOREIGN PATENT DOCUMENTS

| | | | |
|---|---|---|---|
| 529 635 | 3/1993 | European Pat. Off. | H04N 5/22 |
| 5336366 | 12/1993 | Japan | H04N 1/40 |

OTHER PUBLICATIONS

Search Report dated Jun. 17, 1996.
Bischof et al., "Voronoi Pyramids and Hopfield Networks", 12th IAPR International Conference on Pattern Recognition, vol. III, pp. 330–333, Oct. 9–Oct. 13, 1994.
Folsom et al., "A Modular Hierarchical Neural Network for Machine Vision", IJCNN International Joint Conference on Neural Networks, vol. 2, pp. 897–902, Jun. 7–Jun. 21, 1990.

*Primary Examiner*—Bipin Shalwala
*Attorney, Agent, or Firm*—Ratner & Prestia

[57] ABSTRACT

The present invention relates to an image processing apparatus in which gradation correction on each partial region is performed between an image input means and an edge extracting means so that an edge of a region within an image is accurately extracted. An image dividing means 2, which had already learned a relationship between the condition of an image and the necessity of image division so as to judge the condition of the image based on learning results and divide the image appropriately, divides an input image from an image input means 1 into a plurality of image blocks. An image correction information extracting means 3 calculates correction information on each image block. A gradation correction means 4, which had already learned a relationship between correction information and non-linear correction curves to judge correction information based on learning results and perform gradation correction on a target image block using a selected curve, performs gradation correction and enhances an edge which is to be extracted. An image synthesizing means 5 recombines the respective corrected image blocks. An edge extracting means 6 extracts an edge from a synthesized image. An image output means 7 outputs an edge image.

28 Claims, 20 Drawing Sheets

Fig. 2(a)
(Prior Art)

PREVIT OPERATOR

| 1 | 0 | −1 |
|---|---|---|
| 1 | 0 | −1 |
| 1 | 0 | −1 |

$\Delta_x f$

| 1 | 1 | 1 |
|---|---|---|
| 0 | 0 | 0 |
| −1 | −1 | −1 |

$\Delta_y f$

Fig. 2(b)
(Prior Art)

SOBEL OPERATOR

| 1 | 0 | −1 |
|---|---|---|
| 2 | 0 | −2 |
| 1 | 0 | −1 |

$\Delta_x f$

| 1 | 2 | 1 |
|---|---|---|
| 0 | 0 | 0 |
| −1 | −2 | −1 |

$\Delta_y f$

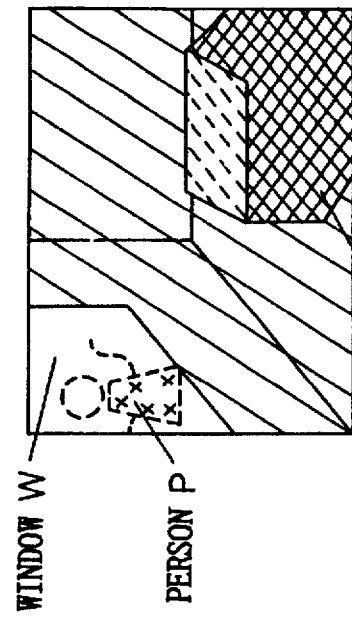
Fig. 3(a) (Prior Art) INSIDE ROOM VIEWED WITH HUMAN EYES
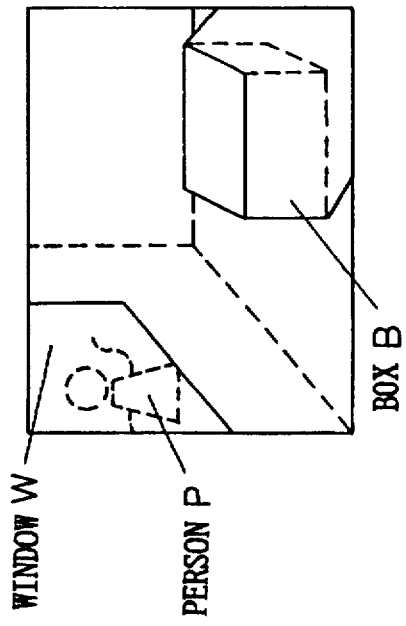
Fig. 3(b) (Prior Art) IMAGE RECORDED BY TV CAMERA
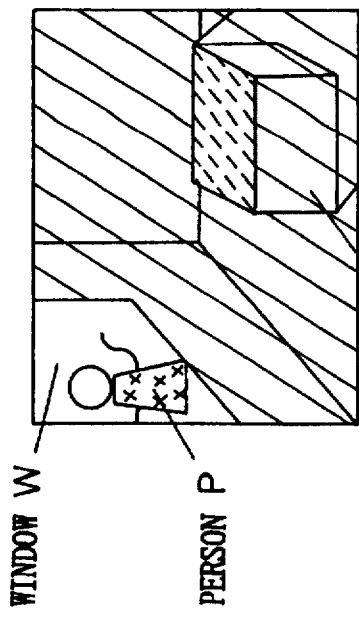
Fig. 3(c) (Prior Art) RESULT OF EDGE EXTRACTION ON IMAGE (b) (NO. 1)
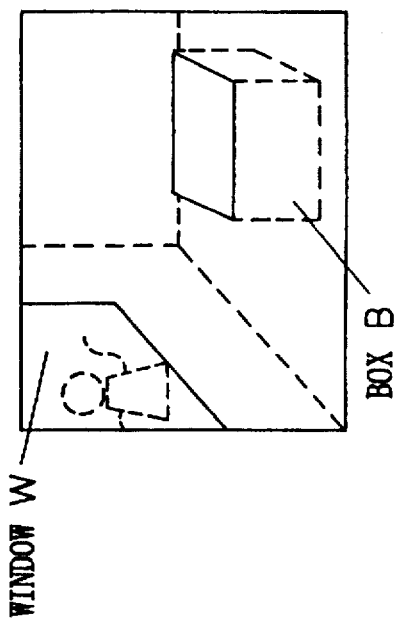
Fig. 3(d) (Prior Art) RESULT OF EDGE EXTRACTION ON IMAGE (b) (NO. 2)

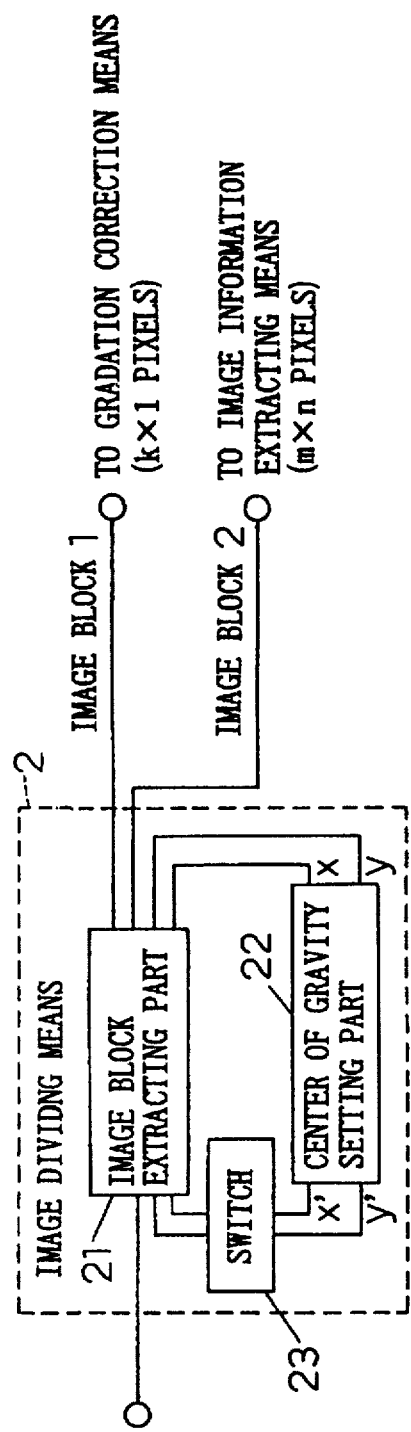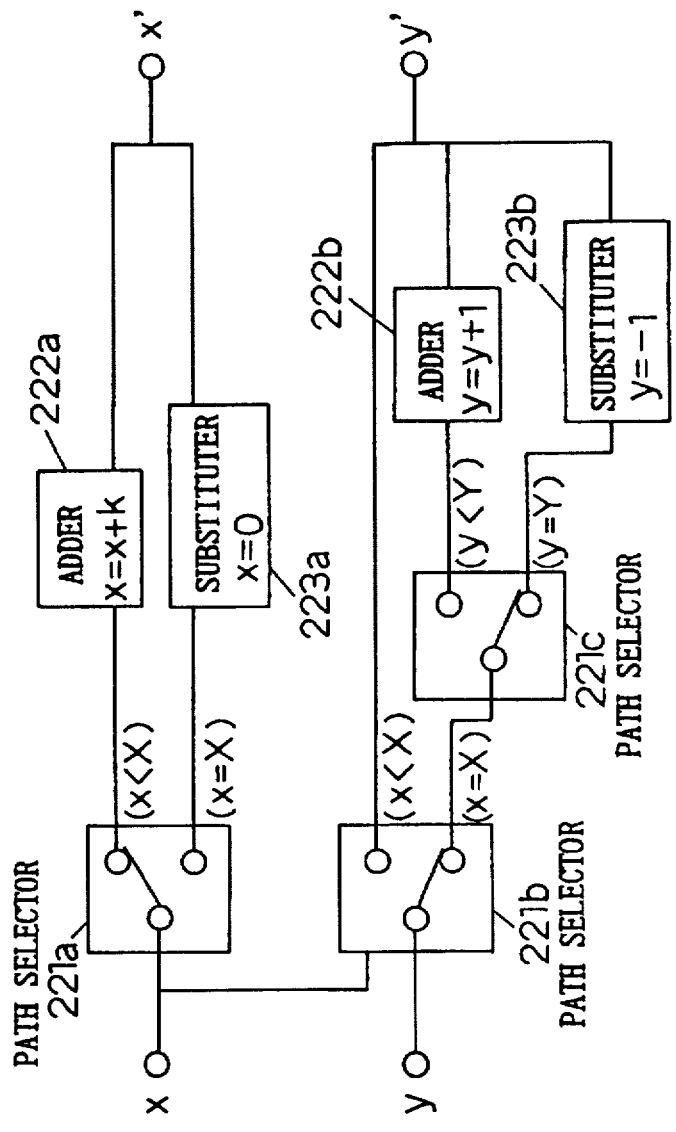
Fig. 5(a)
Fig. 5(b)

DIVISION NOT NEEDED     DIVISION NOT NEEDED     DIVISION NEEDED
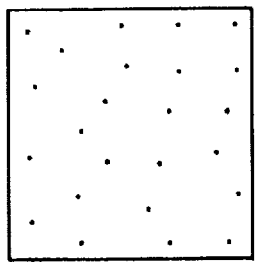     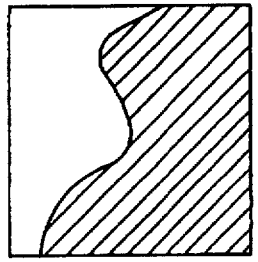     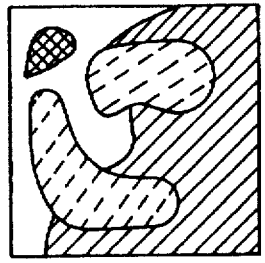
Fig. 12(a)     Fig. 12(b)     Fig. 12(c)
DIVISION
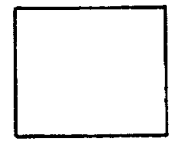
FIRST
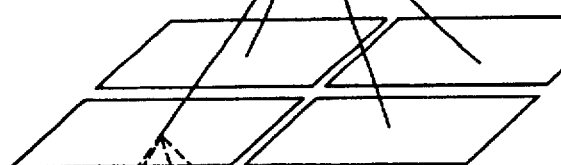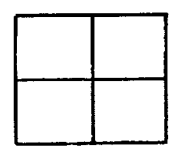
SECOND
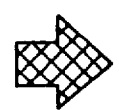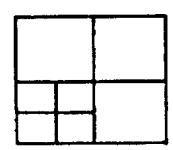
THIRD
Fig. 12(d)

CORRECTION TARGET REGION : 
IMAGE INFORMATION EXTRACTION TARGET REGION : m×n PIXEL REGION
Fig. 13(a)
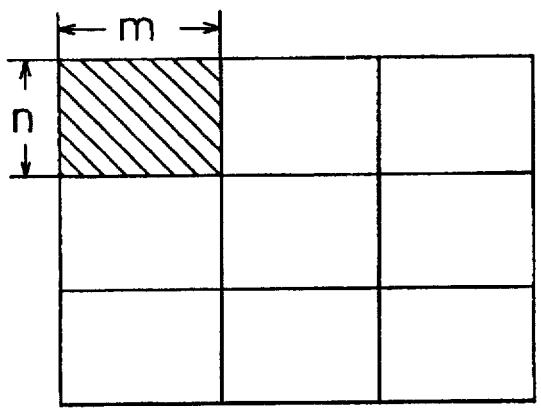
Fig. 13(b)
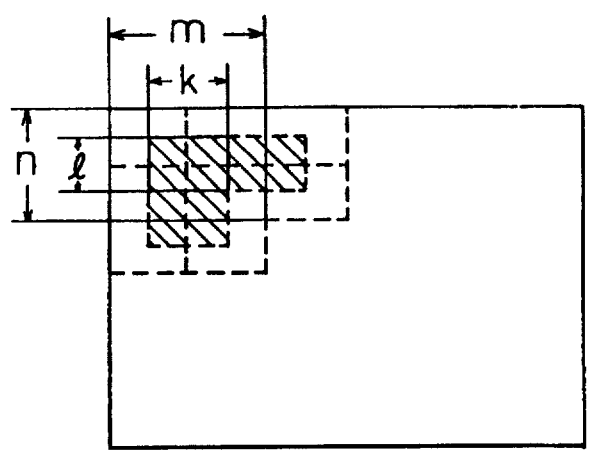

RESULT OF DIVISION OF ORIGINAL IMAGE BY IMAGE DIVIDING MEANS

RESULT OF GRADATION CORRECTION ON IMAGE BLOCKS

RESULT OF EDGE EXTRACTION ON IMAGE (b) (NO. 1)

RESULT OF EDGE EXTRACTION ON IMAGE (b) (NO. 2)

METHOD AND APPARATUS FOR GRADATION CORRECTION AND IMAGE EDGE EXTRACTION

BACKGROUND OF THE INVENTION

1. Field of the Invention

The present invention relates to an image processing apparatus which is equipped with an edge extraction processing function.

2. Related Art of the Invention

In a conventional method of extracting an edge of an object existing in an image, an image signal from a TV camera is A/D converted and binarized using a certain threshold value and a binarizing borderline is extracted as an edge. In another conventional method, an edge is extracted using a differential operator without performing binarization.

Referring to FIG. 1, there is shown therein diagrams showing edge extraction according to conventional methods. First, FIG. 1(a) will be described. An A/D converted image signal (expressing one image page) supplied from an image input means 121 is fed to an edge extracting means 122. The edge extracting means 122 is formed by a binarized threshold value memory part 1221, a threshold value processing part 1222 and a borderline tracking part 1223. The image signal from the image input means 121 is supplied to the threshold value processing part 1222, and the threshold value processing part 1222 binarizes the image signal based on a threshold value which is stored in the binarized threshold old value memory part 1221. That is, "1" is output if a differentiated density value of each pixel is larger than a certain value while "0" is output if such a differentiated density value is smaller than the certain value. The image signal binarized by the threshold value processing part 1222 is supplied to the borderline tracking part 1223. The binarizing borderline is tracked so that an edge is extracted. The edge image obtained by the borderline tracking part 1223 is output from an image output means 123.

Next, FIG. 1(b) will be described. An A/D converted image signal (expressing one image page) supplied from the image input means 121 is fed to an edge extracting means 122. The edge extracting means 122 is formed by a differentiating part 1224, a binarized threshold value memory part 1221, a threshold value processing part 1222 and a thinning processing part 1225. The image signal from the image input means 121 is supplied to the differentiating part 1224, first. The differentiating part 1224 concurrently use differentiating operators for each of the pixels of one image so that the density value of each pixel is differentiated. FIG. 2 shows examples of the differentiating operators, namely, a previt operator and a sobel operator. The differentiated image signal is supplied to the threshold value processing part 1222 so that the threshold value processing part 1222 performs binarization on each pixel based on a threshold value which is stored in the binarized threshold value memory part 1221. The image signal binarized by the threshold value processing part 1222 is supplied to the thinning processing part 1225 which will then extract a centerline which has a line width of 1. The image thinned by the thinning processing part 1225, that is, the edge image is output from the image output means 123.

However, since a TV camera has a narrower dynamic range compared with a natural object, when edge extraction is performed in the conventional systems as above, an edge in a shadow region is not correctly extracted, a region surrounding the shadow region is extracted erroneously, or other problems occur. Referring now to FIG. 3, there is shown specific examples of the problems. FIG. 3(a) shows an image of inside a room as viewed with human eyes. Light enters into the room from a window W, creating a shadow from a box B which is placed in the room. The window W looks very bright, the room looks medium bright while the shadow of the box B looks dark. However, having a wide dynamic range for brightness, human eyes can recognize what exist in the shadow region and scenery outside the window.

On the other hand, FIG. 3(b) shows an image of inside the room as viewed with a TV camera. As described before, a TV camera has a narrower dynamic range for sensing brightness. Hence, when the window W is focused, the room looks very dark so that the TV camera cannot clearly recognize the box B in the shadow region. Meanwhile, when the room is focused, the luminance of the region of the window W saturates so that the region looks white, which makes it impossible to recognize the scenery outside the window W.

If edge extraction is performed on the image as such, in the conventional example shown in FIG. 1(a) for instance, an edge of only the top surface of the box B which is under sunlight is extracted but extraction of an edge of a shadow portion of the box B is likely to fail as shown in FIG. 3(c). Further, in the conventional example shown in FIG. 1(b), it is also likely that the shadow of the box B will be erroneously extracted as an edge or edges of the scenery outside the window W and the shadow portion of the box B will not be extracted as shown in FIG. 3(d). In either one of the conventional examples, it is difficult to extract correct edges of the scenery outside the window W and the box B. The broken lines in FIG. 3 (c) and (d) represent the edges which can not be extracted by the conventional example.

To accurately extract an edge of such a natural image in which both a bright region and a dark region exist, it is considered effective to perform edge extraction after brightening the dark region without influencing the bright region. Still, only one type of gradation correction on one image is insufficient.

SUMMARY OF THE INVENTION

The present invention has been made to solve these problems. It is therefore an object of this invention to provide an image processing apparatus which adds partial gradation correction between the image input means and the edge extracting means and which accurately extracts an edge of a region within an image.

To achieve the above objects, the invention provides an image processing apparatus comprising: an image input means for receiving an image frame/field; an image dividing means for dividing the image frame/field into a certain number of image blocks; an image correction information extracting means for extracting at least one type of image information which serves as a reference of gradation correction from an image signal corresponding to each of the image blocks; a gradation correction means for pretreating for edge extraction by using gradation correction of the image signal corresponding to each of the image blocks in consideration of the image information; an image synthesizing means for synthesizing a pretreated frame/field by using the image signals each of which is pretreated by the gradation correction means; an edge extracting means for extracting an edge image from the pretreated frame/field; and an image output means for outputting the edge image.

Further, to achieve the above objects, the invention also provides an image processing apparatus comprising: an image input means for receiving an image frame/field; an image dividing means for dividing the image frame/field into a certain number of image blocks; an image correction information extracting means for extracting at least one type of image information which serves as a reference of gradation correction from an image signal corresponding to each of the image blocks; a gradation correction means for pretreating for edge extraction by using gradation correction of the image signal corresponding to each of the image blocks in consideration of the image information; an edge extracting means for extracting an edge image from the image signal which is pretreated by the gradation correction means; an image synthesizing means for synthesizing an edge frame/field by using the edge images each of which is extracted by the edge extracting means; and an image output means for outputting the edge frame/field.

In an image processing apparatus structured as above, when an image signal expressing one image page is supplied to the image dividing means, the image dividing means divides the image signal into a plurality of image blocks and provides the image correction information extracting means with the image signal every image block. The image correction information extracting means extracts one type or a plurality types of correction information from each of the image signals of the image blocks, calculates the correction information and outputs the correction information to the gradation correction means. The gradation correction means performs proper gradation correction on each image block in accordance with the correction information and thereafter edge extraction is performed.

Thus, an image is divided into the plurality of the image blocks prior to edge extraction and gradation correction suitable to each image block is performed so that an image having a wide dynamic range is obtained. As a result, it is possible to accurately extract an edge to detail which has been heretofore impossible with the conventional edge extraction methods alone. For example, gradation correction is performed on the image shown in FIG. 17(a) or FIG. 20(a) to enhance edges of the object which exists in the shadow region as shown in FIG. 17(b) or FIG. 20(b), whereby an edge (region) of the box is correctly extracted. FIG. 17(c), FIG. 20(c) or FIG. 20(d) shows a result of edge extraction by embodiments of an image processing apparatus according to the present invention.

BRIEF DESCRIPTION OF THE DRAWINGS

These and other objects, advantages, features, and uses will become more apparent as the description proceeds, when considered with the accompanying drawings in which:

FIG. 2(a) is a view of a previt operator;

FIG. 2(b) is a view of a sobel operator;

FIG. 3(a) is a view of an image of inside a room as viewed with human eyes;

FIG. 3(b) is a view of an image of inside the room as viewed with a TV camera;

FIG. 3(c) is a view showing a result of the edge extraction shown in FIG. 2(a) performed on the image shown in FIG. 3(b);

FIG. 3(d) is a view showing a result of the edge extraction shown in FIG. 2(b) performed on the image shown in FIG. 3(b);

FIG. 5(a) is a block diagram showing an embodiment of an image dividing means of FIG. 4(a) in the case of FIG. 13(b);

FIG. 5(b) is a block diagram showing an embodiment of a center of gravity setting part of FIG. 5(a);

FIGS. 12(a) to 12(c) are views showing states of a natural image;

FIG. 12(d) is a view showing an image as it is divided by an image dividing means depending on a need;

FIG. 13(a) is a view showing a state where an image block for extracting information coincides with an image block for performing gradation correction;

FIG. 13(b) is a view showing an example where an image block for extracting information is different from an image block for performing gradation correction;

DESCRIPTION OF INVENTION

[Embodiment 1]

Figure 1A:
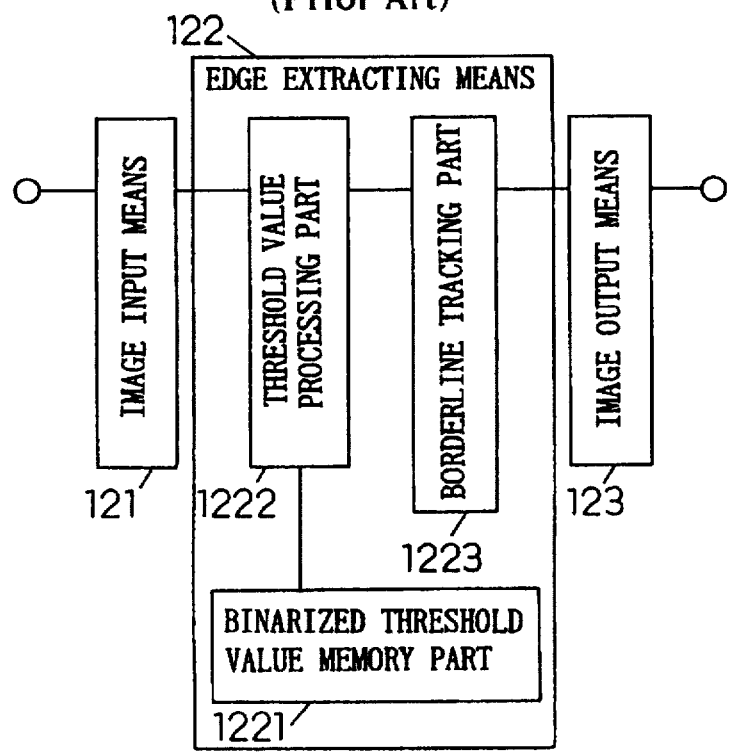
FIG. 1(a) is a block diagram showing a first example of a structure which is generally used in conventional edge extraction.
Figure 1B:
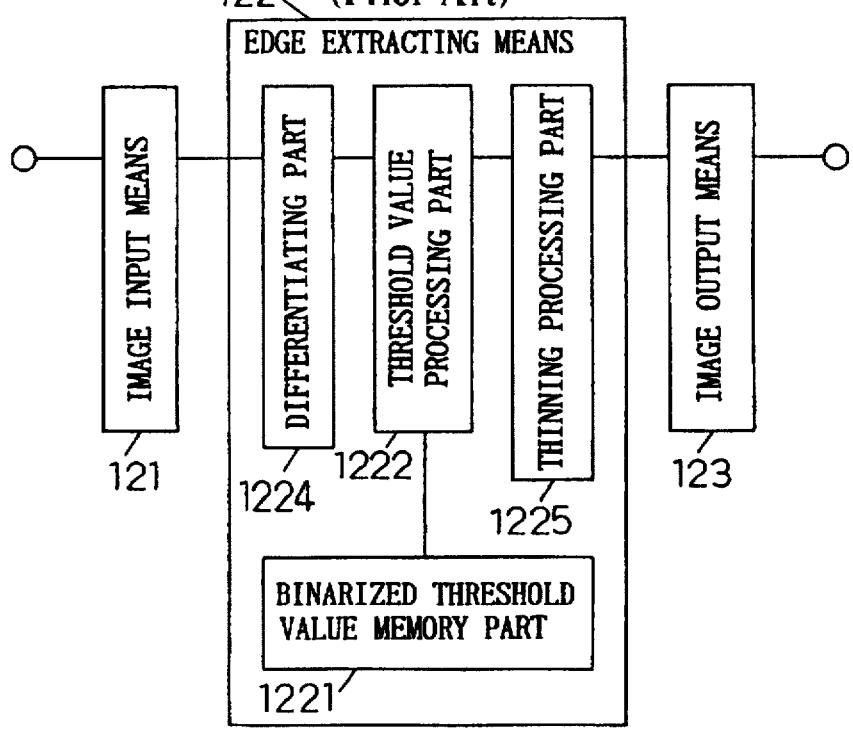
FIG. 1(b) is a block diagram showing a second example of a structure which is generally used in conventional edge extraction.
Figure 4A:
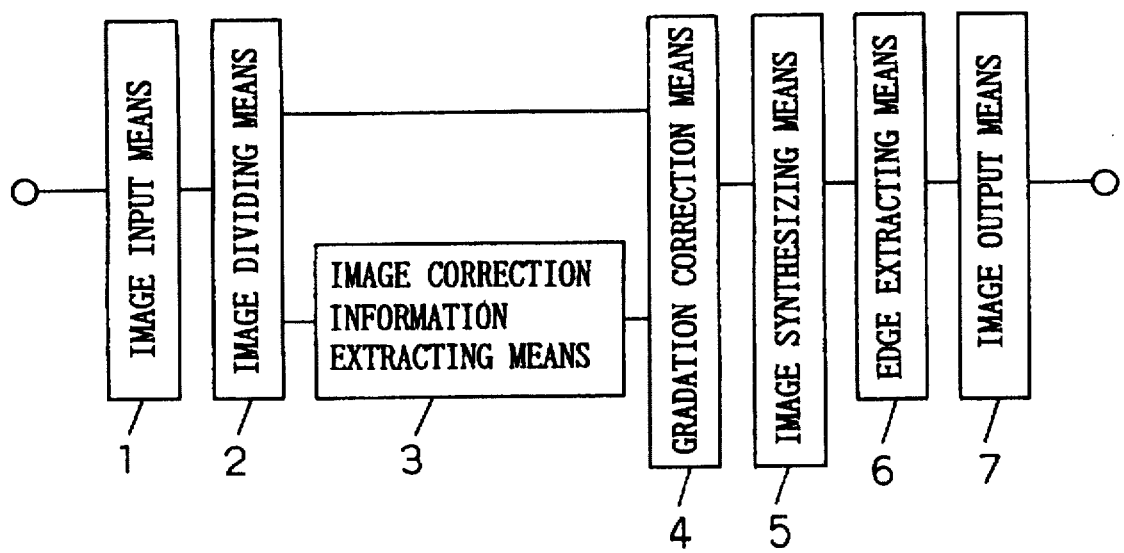
FIG. 4(a) is a block diagram of one embodiment of an image processing apparatus according to the present invention.

Referring now to FIG. 4(a), there is shown therein a block diagram of a first embodiment of an image processing apparatus according to the present invention. The image processing apparatus is formed by an image input means 1 for receiving an image frame, an image dividing means 2 for dividing the image frame supplied from the image input means 1 into a plurality of image blocks, an image correction information extracting means 3 for extracting one type or a plurality types of correction information for gradation correction from an image signal corresponding to each of the image blocks, a gradation correction means 4 for performing pretreatment for gradation correction of the image signal corresponding to each of the image blocks in consideration of the correction information, an image synthesizing means 5 for synthesizing a pretreated frame by using the image signals each of which is pretreated by said gradation correction means 4, an edge extracting means 6 for extracting an edge image from the pretreated flame and an image output means 7 for outputting the edge image which is extracted by the edge extracting means 6.

Referring to FIG. 5(a), there is shown therein a block diagram showing a first embodiment of the image dividing means 2 of FIG. 4. The image dividing means 2 comprises an image block extracting part 21, which extracts an image block which has a certain point (x, y) as the center of gravity and which measures m×n pixels and outputs an image signal which is contained within the image block to the image correction information extracting means 3 while providing the gradation correction means 4 with an image block which has the same center of gravity but measures k×l pixels (k≦m, l≦n), and a center of gravity setting part 22 which updates the values of x and y after the image block extracting part 21 extracts these two types of image blocks. The initial values of x and y are both "0".

Referring to FIG. 5(b), there is shown therein a block diagram showing a specific embodiment of the center of gravity setting part 22 of FIG. 5(a). The values x and y from the image block extracting part 21 are supplied to path selection parts 221a and 221b, respectively. Assuming that the size of one image page (or an image frame) is X×Y, the path selector 221a outputs the value x to an adder 222a so that the value x added to a value k is output if x<X. If x=X, the path selector 221a outputs the value x to an adder 223a so that "0" is substituted for the value x and a resulting value is output. The path selector 221b outputs the y as it is if x<X. If x=X, path selector 221b outputs the y to a path selector 221c. The path selector 221c outputs the value y to the adder 222b so that the value y added to "1" is output if y<Y. If y=Y, the path selector 221c outputs the value y to the adder 223b so that "−1" is substituted for the value y and a resulting value is output. Values x' and y' output from the center of gravity setting part 22 are supplied to a switch 23. If y≠−1, the values x' and y' (i.e., new center of gravity) are output to the image block extracting part 21. In the structure as above, the center of gravity of an image block is shifted in a raster scanning direction to extract each image block.

Figure 6:
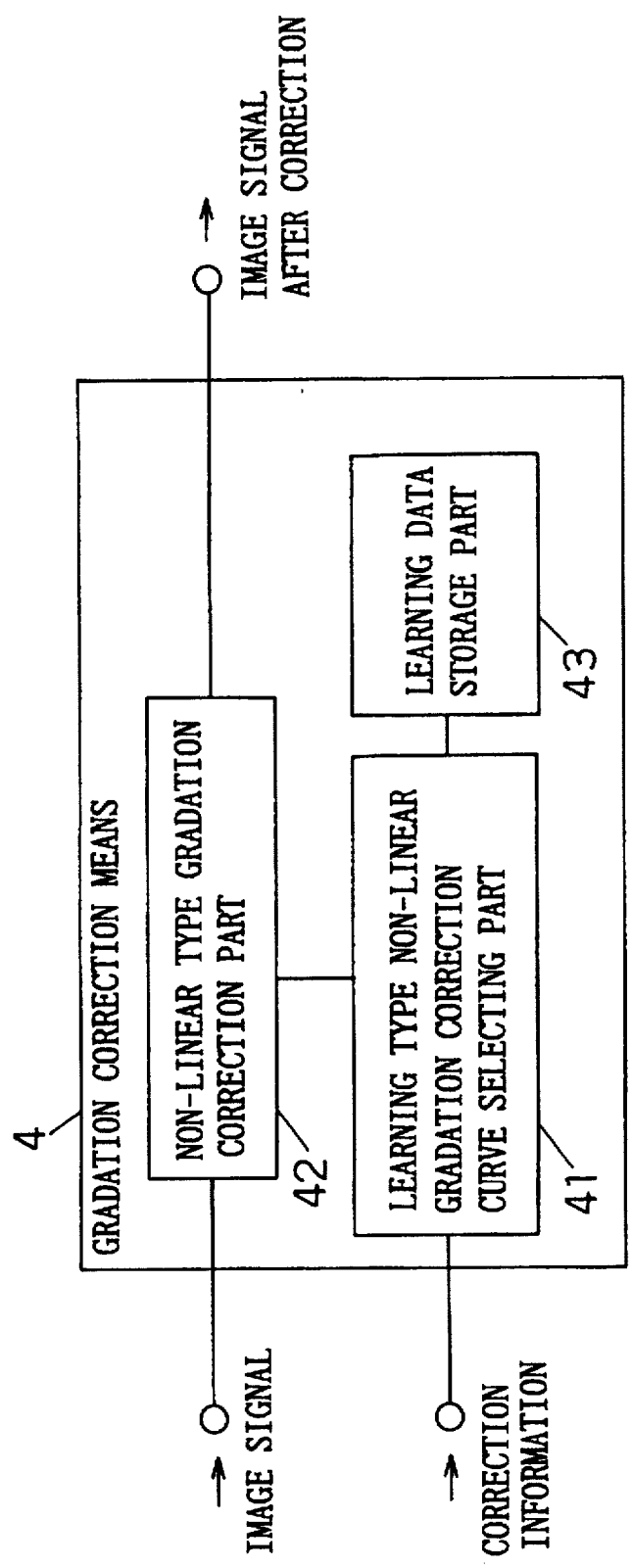
FIG. 6 is a block diagram showing an embodiment of a gradation correction means of the present invention.

Referring to FIG. 6, there is shown therein a block diagram showing an embodiment of the gradation correction means 4 of FIG. 4. The gradation correction means 4 is formed by a learning type non-linear gradation correction curve selecting part 41, which had preliminarily learned a relationship between correction information corresponding to various states and a non-linear gradation correction curve which is to be used for gradation correction so as to judge the correction information which is obtained by the image correction information extracting means 3 and select a non-linear gradation correction curve (or a parameter of the non-linear gradation correction curve) which is to be used for gradation correction, a non-linear gradation correction part 42, which performs gradation correction on a correction target region using the non-linear gradation correction curve which is selected by the learning type non-linear gradation correction curve selecting part 41 and outputs a corrected image signal, and a learning data storage part 43 for storing data which is used by the learning type non-linear gradation correction curve selecting part 41 for learning.

Figure 7A:
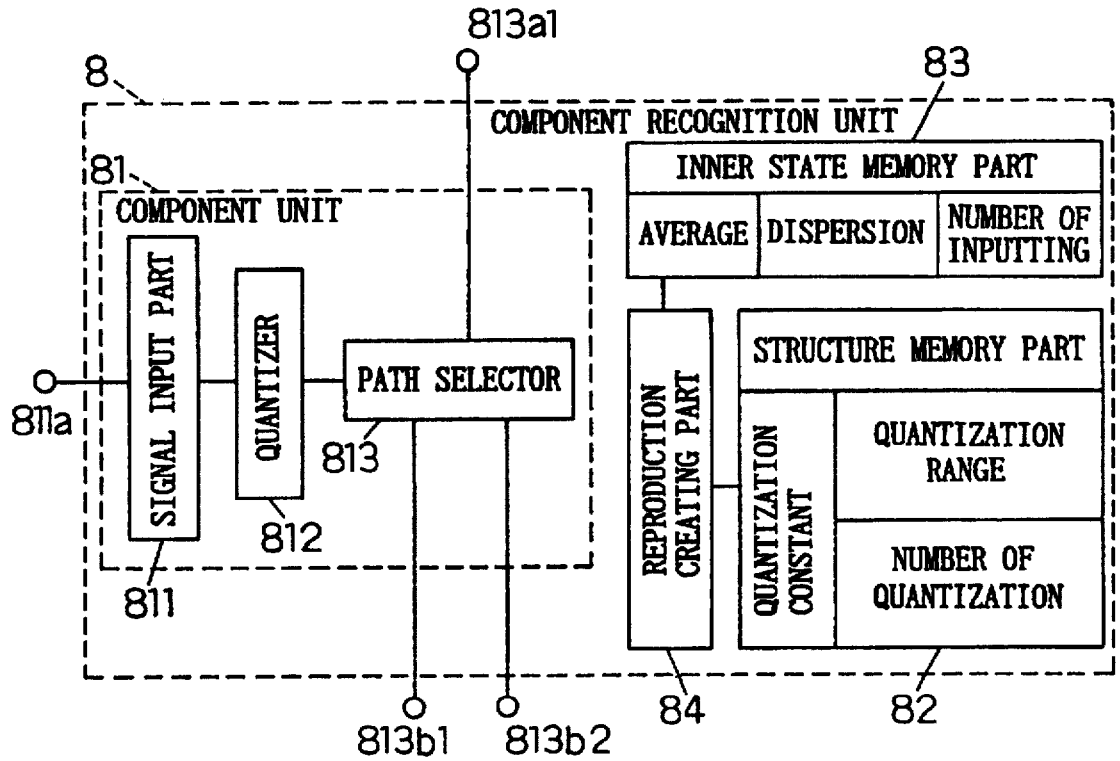
FIG. 7(a) is a block diagram showing an embodiment of a component recognition unit which forms a network of a learning type image division judging part or a non-linear gradation correction curve selecting part.
Figure 7B:
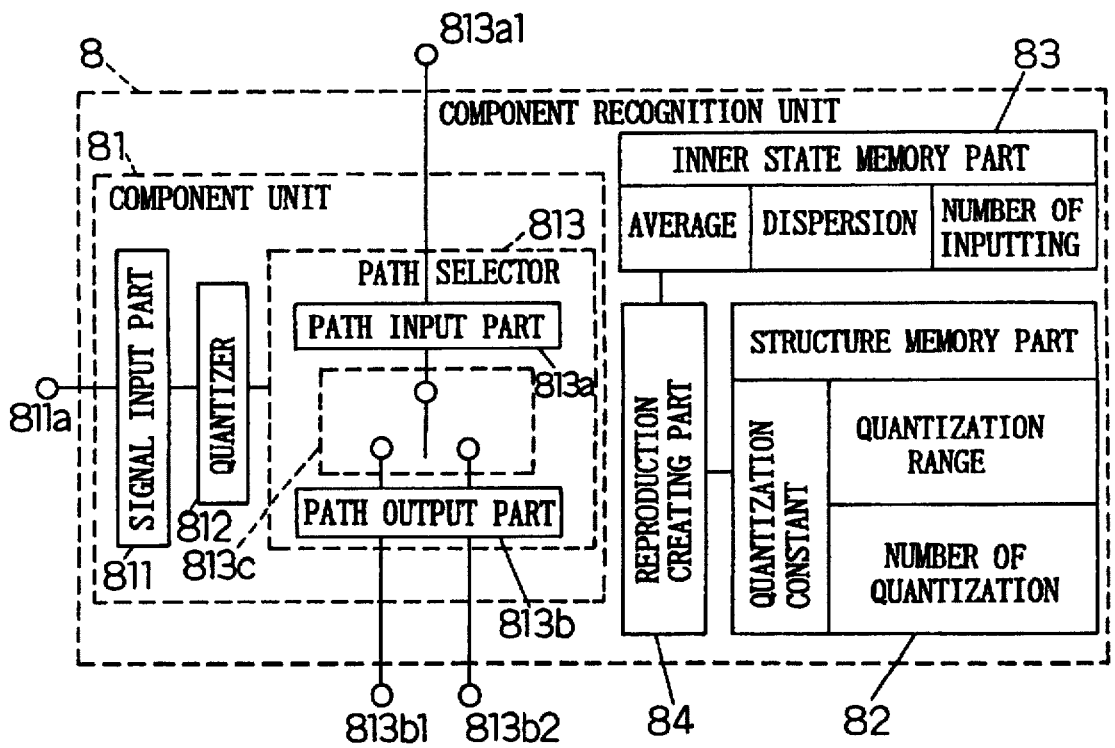
FIG. 7(b) is a block diagram showing an example where a path selecting part of FIG. 7(a) is formed by a path input part, a path output part and a switch.

FIG. 7 and 8 are block diagrams showing an embodiment of a component recognition unit 8 which forms a network in the learning type non-linear gradation correction curve selecting part 41. Referring to the drawing of FIG. 7(a), a component unit 81 is formed by a signal input part 811, a quantizer 812 for quantizing in accordance with the input signal supplied from the signal input part 811 and a path selector 813 for selecting a path in accordance with an output from the quantizer 812. A component recognition unit 8 is formed by the component unit 81, a structure memory part 82 for storing the range and the number of quantization of the quantizer 812 as quantization constants, an inner state memory part 83 for storing the average, the dispersion and the number of inputting of an input signal to the component unit 81 as an inner state and a reproduction creating part 84 for halving the quantization range based on an inner state which is stored in the inner state memory part 83 and creating the component unit 81 as it is before divided. FIG. 7(b) shows an embodiment in which the path selector 813 of FIG. 7(a) is formed by a path input part 813a which includes one path input terminal 813a1, a path output part 813b which includes two path output terminals 813b1 and 813b2, and a switch 813c.

Figure 8A:
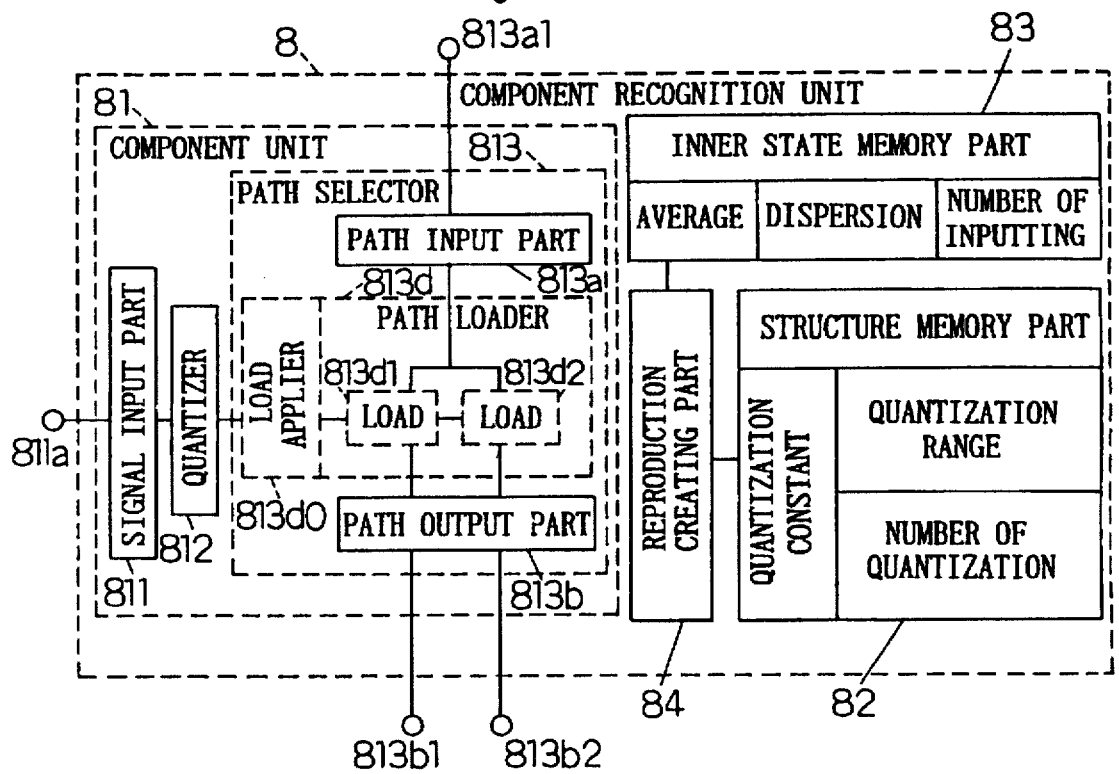
FIG. 8(a) is a block diagram showing an example where path selecting part of FIG. 7(a) is formed by a path input part, a path output part and a load applier.
Figure 8B:
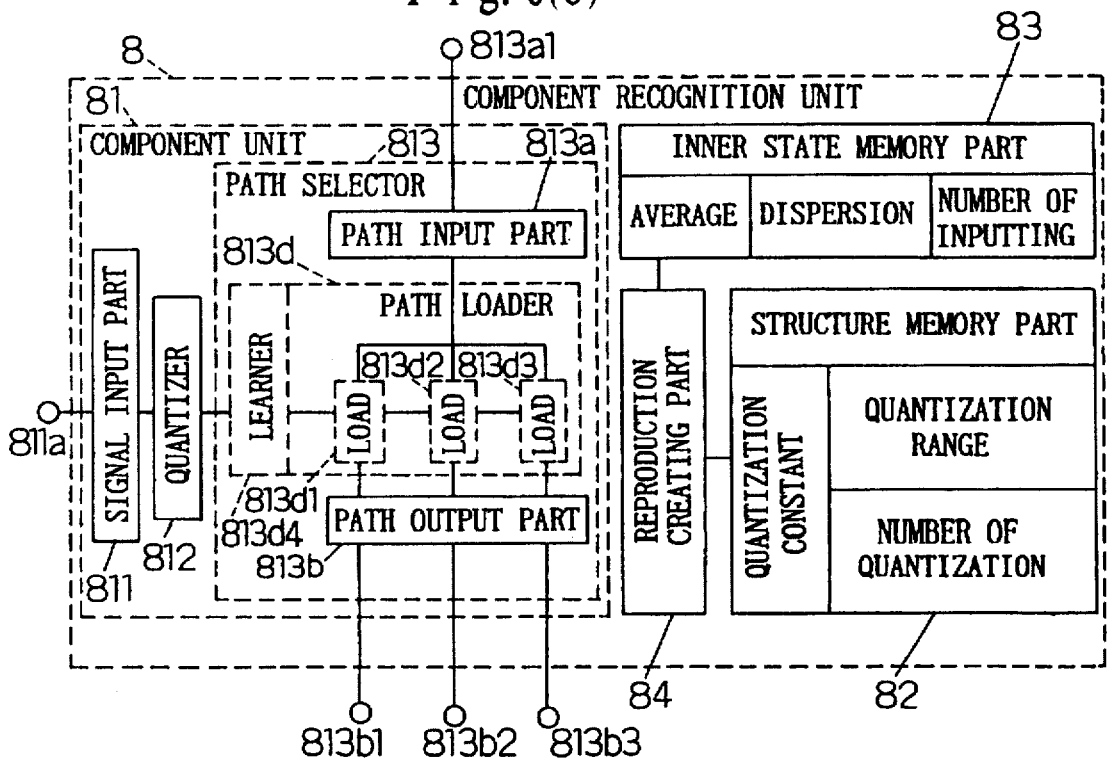
FIG. 8(b) is a block diagram showing an example where the load applier of FIG. 8(a) is replaced with a learner.

FIG. 8(a) shows an embodiment in which the path selector 813 of FIG. 7(a) is formed by the path input part 813a which includes one path input terminal 813a1, the path output part 813b which includes the two path output terminals 813b1 and 813b2, and a path load part 813d. FIG. 8(b) shows an embodiment in which the path load part 813d0 of FIG. 8(a) is replaced with a learner 813d4.

Figure 9:
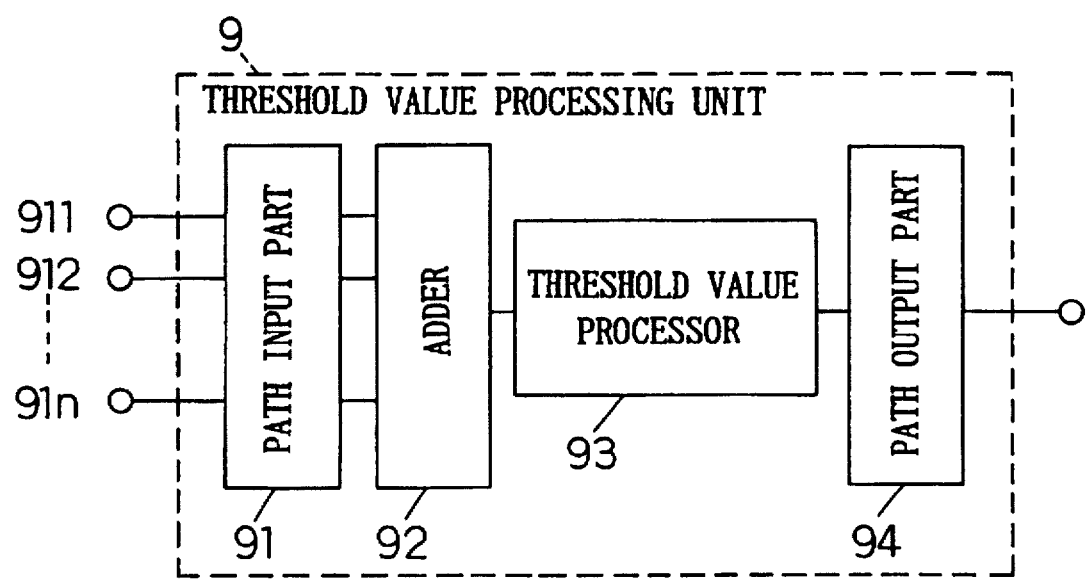
FIG. 9 is a view showing an embodiment of a threshold value processing unit which forms the network of the learning type image division judging part or the non-linear gradation correction curve selecting part.

Referring to FIG. 9, there is shown therein an embodiment of a threshold value processing unit 9. The threshold value processing unit 9 is formed by a path input part 91, an adder 92 for adding up input signals from a plurality of path input terminals 911 to 91n (n is an optional natural figure), a path output terminal 94 and a threshold value processor 93 for performing threshold processing on a signal which is obtained by addition performed by the adder 92 and for determining how the signal should be output to the path output terminal 94.

Figure 10:
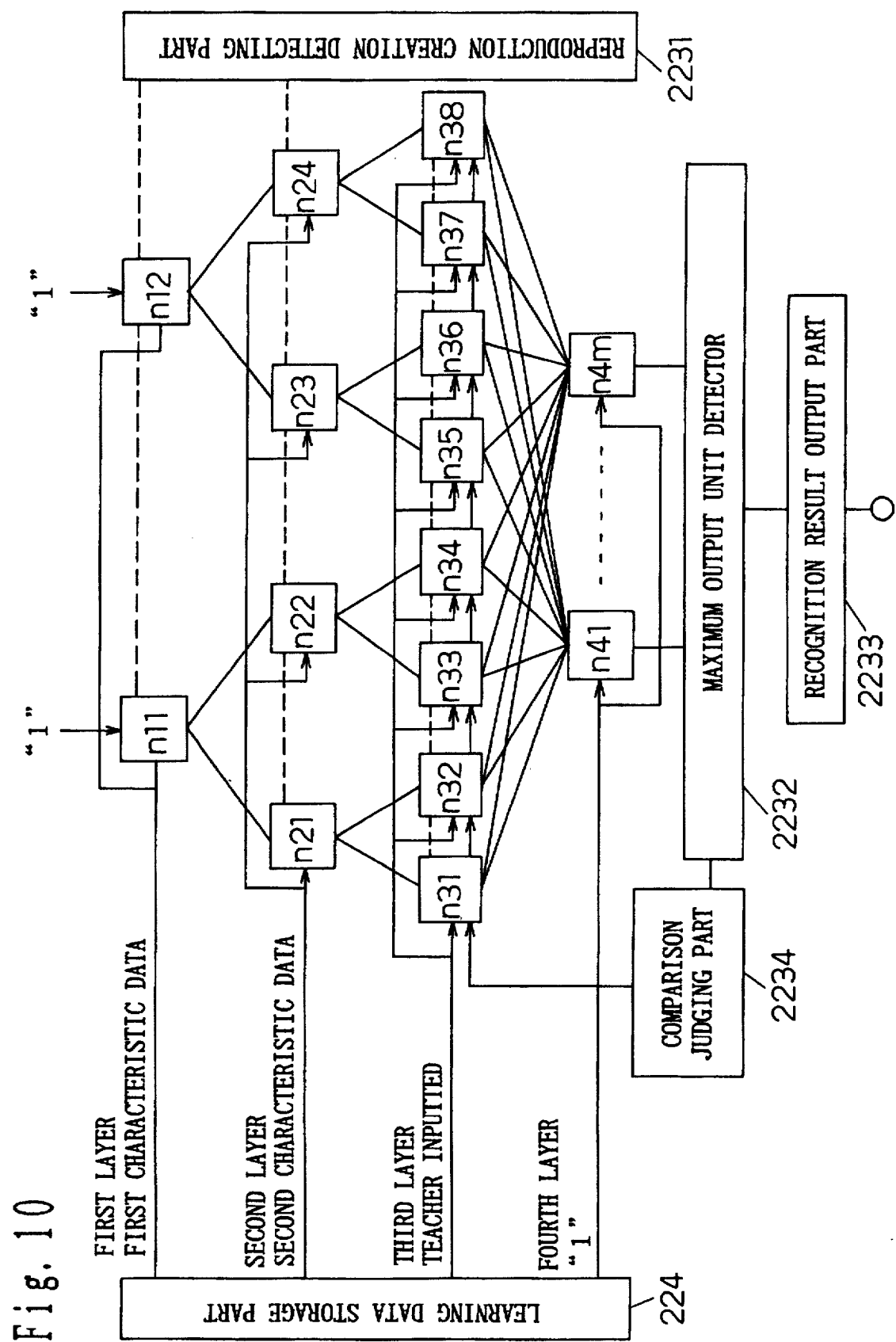
FIG. 10 is a view showing an embodiment of the learning type image division judging part or the non-linear gradation correction curve selecting part.

Referring to FIG. 10, there is shown therein an embodiment of the learning type non-linear gradation correction curve selecting part 41 of FIG. 6. FIG. 10 shows an example in which two types of characteristic quantity data (first characteristic data and second characteristic data) are classified and recognized as m types of solutions. The learning type non-linear gradation correction curve selecting part 41 may be formed by a network linking component recognition units to each other in a hierarchy, a reproduction creation detecting part 2231, which detects all component recognition units which started reproduction creation and instructs to reproduce the component recognition units including those which depend from component recognition units of a first and a second layers creating reproductions, a maximum component detector 2232 for detecting a component whose output is the largest among outputs from the threshold value processing units 9 of a fourth layer, a recognition result output part 2233 for outputting a unit number found by the maximum component detector 2232 as a recognition result, and a comparison judging part 2234 which compares an output from the maximum component detector 2232 with teaching data corresponding to characteristic data currently supplied so as to yield a recognition result and which outputs the recognition result to component recognition units of a third layer during learning. Component recognition units n11 to n12 and n21 to n24 which form the first layer and the second layer of the network may be component recognition units as those shown in FIG. 8(a), for example. Component recognition units n31 to n38 forming the third layer may be component recognition units as those shown in FIG. 8(b), for example. The threshold value processing unit 9 as that shown in FIG. 9 may be used as the fourth layer.

Figure 11:
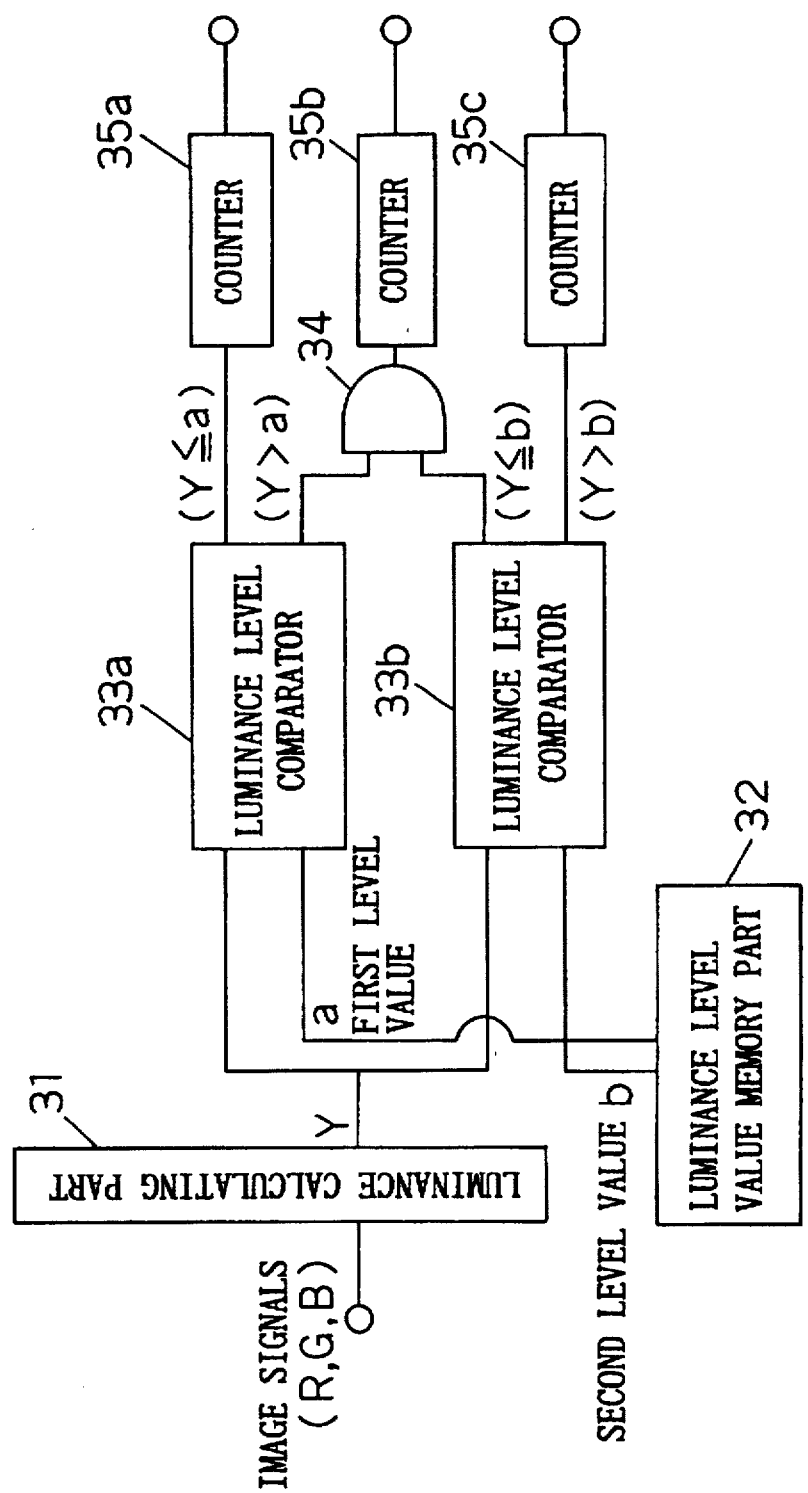
FIG. 11 is a block diagram showing an embodiment of an image information extracting means of FIG. 4.

Referring to FIG. 11, there is shown therein a block diagram showing an embodiment of the image correction information extracting means 3 of FIG. 4. Luminance values of pixels which are contained in an image block are calculated and classified into three levels, i.e., high luminance, medium luminance and low luminance. Frequency values of the three levels are each used as correction information. The image correction information extracting means 3 is formed by a luminance calculating part 31 for calculating luminance values from signals R, G and B of each pixel contained in the image block supplied from the image dividing means 2, a luminance level value memory part 32 for storing boundary values (denoted as a, b in FIG. 11) of luminance values, a luminance level comparator 33a which compares a luminance value output from the luminance calculating part 31 with the value a which is stored in the luminance level value memory part 32 and which then adds "1" to a counter 35a when the luminance value is larger but supplies "1" to an AND circuit 34 when the luminance value is smaller, a luminance level comparator 33b which compares the luminance value with the value b which is stored in the luminance level value memory part 32 and which then supplies "1" to the AND circuit 34 when the luminance value is larger but adds "1" to a counter 35c when the luminance value is smaller, and the AND circuit 34 which adds "1" to a counter 35b when outputs from the luminance level comparators 32a and 32b are both "1". Hence, the counters 35a, 35b and 35c calculate three types of frequency, i.e., a luminance which is larger than the first level value a (high luminance), a luminance which is between the first level value a and the second level value b (medium luminance) and a luminance which is smaller than the second level value b (low luminance), respectively.

Instead of classifying the luminance values into the three levels, the luminance values may be classified into a larger number of levels by connecting luminance level comparators and AND circuits parallel to each other.

The operation of the image processing apparatus in the first embodiment will now be explained. First, an overall operation will be described. An image signal expressing one image page (the size of the image is X×Y) input through the image input means 1 of FIG. 4(a) is divided into image blocks by the image dividing means 2.

Referring to FIG. 12(a), an operation of the image dividing means 2 will be explained. The image signal is fed to the image block extracting part 21 of FIG. 5(a). The image block extracting part 21 extracts two types of image blocks (which are coaxial rectangular) from the image signal. One is an image block 1 (m×n pixels) which is to be sent to the image correction information extracting means 3 of FIG. 4, and the other is an image block 2 (k×l pixels) which is to be sent to the gradation correction means 4 of FIG. 4. FIG. 13 shows an example of division of an image performed by the image block extracting part 21. When k=m and l=n, since the image block 1 and the image block 2 have the same size, gradation correction needs be performed based on only correction information within a correction target region. On the other hand, when k<m and l<n, as shown in FIG. 13(b), image blocks are extracted in such a manner that the image blocks overlap each other, and correction is performed on the image block 2 (k×l pixels in FIG. 13(b)) based on image correction information obtained from the image signal within the image block 1 (m×n pixels in FIG. 13(b)). For instance, assuming that k=m/2 and l=n/2, the size of the image block 1 is four times as large as that of the image block 2. In other words, since not only a target region of gradation correction but pixels surrounding the target region are included in calculation of correction information which serves as a reference of the gradation correction, gradation correction considering a state of the surrounding region is realized. Extraction of image blocks starts at a left upper point (center of gravity (0, 0)) of the image. After extracting the respective image blocks, a coordinate position (x, y) of the center of gravity is output to the center of gravity setting part 22. The center of gravity setting part 22 shifts the coordinate position by the values k or l in the raster scanning direction. For example, if the center of gravity input is (0, 0), the adder 222a adds the value k to the x-coordinate so that (k, 0) is output. The value k is added to the x-coordinate while x<X is satisfied. When the center of gravity is moved to (x, 0), a substituter 223a substitutes "0" for the x-coordinate while the adder 222b as adds "1" to the y-coordinate so that (0,1) is output. When the center of gravity becomes (X, Y) while this operation is repeated, the substituter 223b substitutes "−1" for the y-coordinate. When y=−1, the switch 23 releases the path so as to complete the image division process. In this manner, the respective image blocks are extracted one by one in such a manner that the image blocks 1 overlap each other, and the image blocks 1 and 2 are supplied to the image correction information extracting means 3 and the gradation correction means 4, respectively.

From an image block which measures m×n pixels supplied from the image dividing means 2, the image correction information extracting means 3 extracts correction information which expresses a state of the image block. In this embodiment, luminance values of pixels which are contained in an image block are calculated and classified into the three levels (high luminance, medium luminance and low luminance), and the frequencies of the respective levels are used as correction information. Referring to FIG. 11, the luminance calculating part 31 calculates luminance values from signals R, G and B of each pixel contained in an image block which is supplied from the image dividing means 2. In the case of a television signal of NTSC method, a luminance value is calculated by the following equation.

$$0.30 \times R + 0.59 \times G + 0.11 \times B \qquad \text{(Eq. 1)}$$

The luminance value thus calculated is compared with the boundary value a between the high luminance level and the medium luminance level by a luminance level comparator $33a$. If the luminance value is equal to or larger than the value a, "1" is added to the high luminance level counter $35a$. A luminance level comparator $33b$ compares a boundary value b between the medium luminance level and the low luminance level with the luminance value. If the luminance value is smaller than the value b, "1" is added to the low luminance level counter $33c$. If the luminance value is smaller than the value a but equal to or larger than the value b, "1" is added to the medium luminance level counter $33b$. The pixels contained in an image block are classified to obtain the three types of correction information in this manner. Since the three types of correction information can be expressed by the following equation, at least two types of information may be supplied to the gradation correction means 4.

Frequency of High Luminance Level+Frequency of Medium Luminance Level+Frequency of Low Luminance Level=The Number of Pixels Contained Within the Image Block  (Eq.2)

Figure 14:
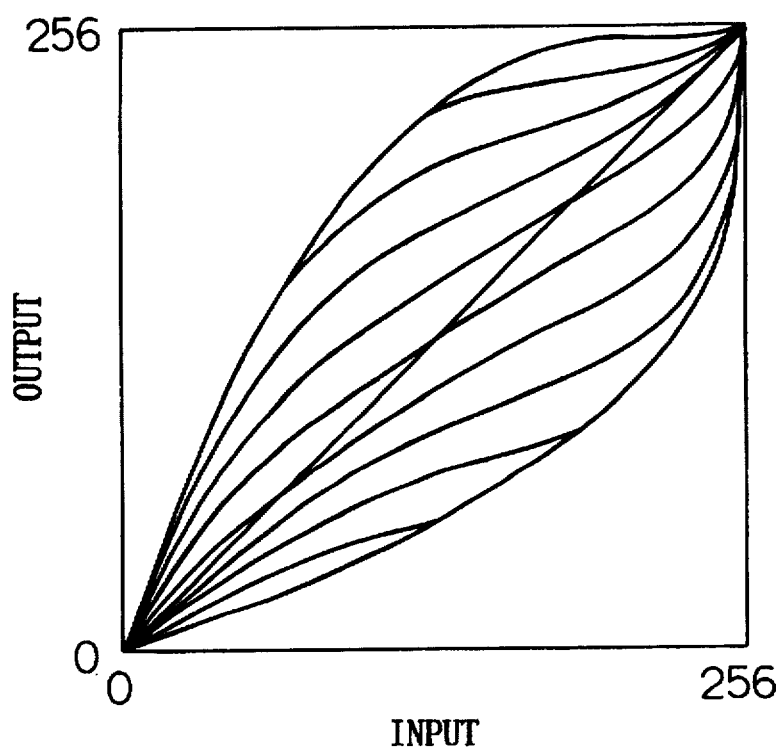
FIG. 14 is a view showing an example of a gradation correction curve which is used by the gradation correction means of the present invention.

The correction information obtained by the image correction information extracting means 3 and the image blocks obtained by the image dividing means 2 are supplied to the gradation correction means 4. As described earlier, the correction information obtained by the image correction information extracting means 3 is supplied to the learning type non-linear gradation correction curve selecting part 41. The learning type non-linear gradation correction curve selecting part 41 had already learned a relationship between correction information corresponding to various states and a non-linear gradation correction curve which should be used for gradation correction such as a non-linear gamma curve. For example, the relationship already learned is a relationship between correction information which is obtained from an image block which is generally dark and a non-linear gradation correction curve which is used to generally brighten an image, or a relationship between correction information which is obtained from an image block which includes a back light portion and a non-linear gradation correction curve which is used to brighten only dark pixels (Learning will be described in detail later.). Correction information is judged based on a result of learning in this manner to select a non-linear gradation correction curve or a parameter of the non-linear gradation correction curve which is to be used for gradation correction. A result of the selected non-linear gradation correction curve (or parameter) and an image signal of a correction target region within the image block are sent to the non-linear gradation correction part 42. The non-linear gradation correction part 42 performs gradation correction on the correction target region using the selected non-linear gradation correction curve and outputs a corrected image signal. Thus, the learning type non-linear gradation correction curve selecting part 41 had already learned non-linear gradation correction curves, and therefore, it is possible to select a proper non-linear gradation correction curve from those non-linear gradation correction curves in accordance with the condition of an image. An embodiment of a non-linear gradation correction curve is shown in FIG. 14.

Figure 15:
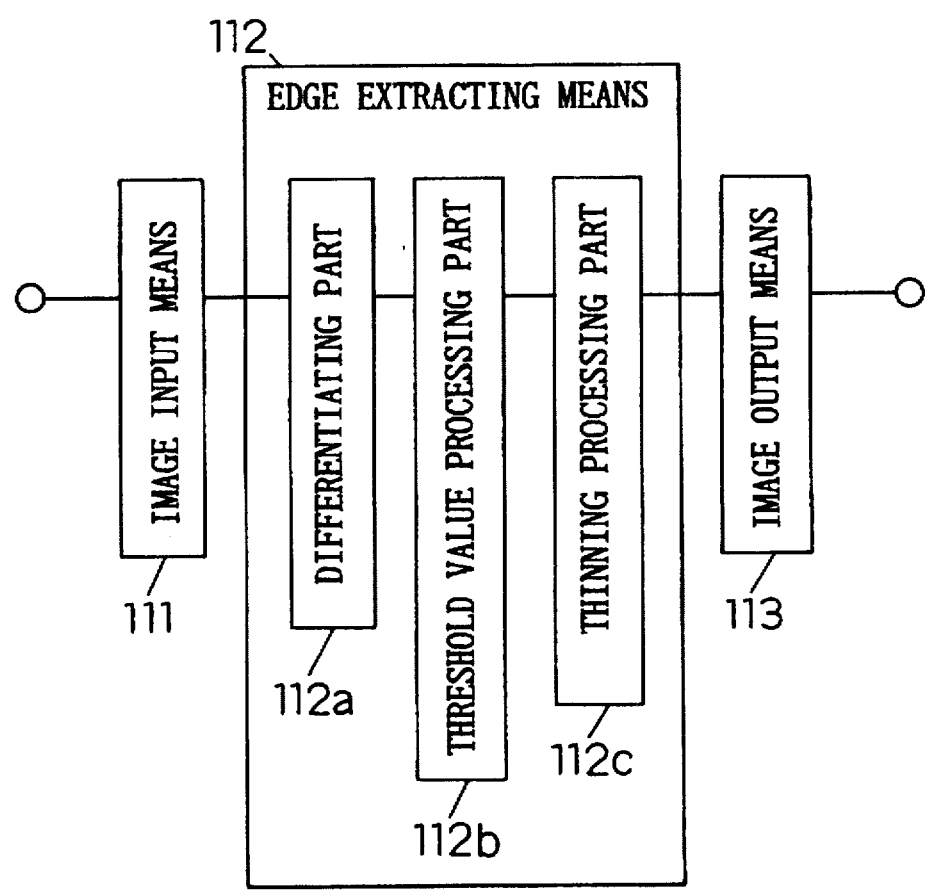
FIG. 15 is a view showing an embodiment of an edge extracting means.

Image blocks corrected in this manner by the gradation correction means 4 which comprises the learning type non-linear gradation correction curve selecting part 41 are synthesized into one image by the image synthesizing means 5 and supplied to the edge extracting means 6. After the edge extracting means 6 performs edge extraction, the image is output from the image output means 7. The edge extracting means 6 may have a structure as that shown in FIG. 15.

The operation of the learning type non-linear gradation correction curve selecting part 41 will be now explained. Referring to FIGS. 7 and 8, there is shown therein an embodiment of the component recognition unit 8 which forms a network in the learning type non-linear gradation correction curve selecting part 41. The signal input part 811, the quantizer 812 and the path selector 813 form a component unit 81. The signal input part 811 provides the quantizer 812 with characteristic data which is input through a signal input terminal $811a$ as data to be recognized. The quantizer 812 quantizes the input characteristic data and supplies a quantized value to the path selector 813.

Referring to FIG. 7(a), denoted at $813a1$ is a path input terminal and denoted at $813b1$ and $813b2$ are path output terminals. These terminals are linked to each other when component recognition units (8) are combined each other to form a network. The path selector 813 is constructed so as to change linkage between the path input terminal $813a1$ and the path output terminals $813b1$ and $813b2$ in accordance with a value received from the quantizer 812. The structure memory part 82 stores the quantization range of the quantizer 812, the number of quantization and the number of the path input terminals and the path output terminals of the path selector 813.

The inner state memory part 83 stores the average, the dispersion and the total number of input signals as an inner state of the component recognition unit 8. The reproduction creating part 84 halves the quantization range of the component recognition unit 8 which is stored in the structure memory part 82 when the inner state which is stored in the inner state memory part 83 reaches a certain value, to thereby reproduce the component recognition unit 8.

Referring to FIG. 7(b), in the component recognition unit 8, based on the value supplied from the quantizer 812, the switch $813c$ links the path input terminal $813a1$ of the path input part $813a$ to the path output terminal $813b1$ or $813b2$ of the path output part $813b$.

Referring to FIG. 8(a), loads $813d1$ and $813d2$ are weights which are to be added to path output signals which are output to the path output terminals $813b1$ and $813b2$ of the path output part $813b$. A load applier $813d0$ changes these loads in accordance with a value output from the quantizer 812. The loads $813d1$ and $813d2$ weight a path signal which is input at the path input part $813a$. The path output part $813b$ outputs a weighted path signal to the path output terminals $813b1$ and $813b2$.

Referring to FIG. 8(b), loads $813d1$ to $813d3$ are weights which are to be added to path output signals which are output to the path output terminals $813b1$ to $813b3$ of the path output part $813b$. During learning, in accordance with a value supplied to the path input terminal $813a1$, the learner $813d4$ updates a load with a path output terminal which is indicated by values output from the path input terminal $813a1$ and the quantizer 812. During recognition, the quantizer 812 receives no signal, the loads $813d1$ to $813d3$ weight a path signal which is input at the path input part $813a$, and the path output part $813b$ outputs a weighted path signal to the path output terminals $813b1$ to $813b3$.

Referring to FIG. 9, the operation of the threshold value processing unit 9 itself will be now explained. The adder 92 adds up input signals from a plurality of the path input terminals 911 to 91n (n is an optional natural figure of the path input part 91). The threshold value processor 93 performs threshold processing on a signal which is yielded by the adder 92 and determines in which manner the signal should be output to the path output terminal 94.

Referring to FIG. 10, a learning operation of the learning type non-linear gradation correction curve selecting part 41 will be described. The learning operation consists of forward processing, reproduction processing and load change processing.

First, the forward processing will be described. First, "1" is supplied as a path signal to the path input terminals of component recognition units n11 and n12 of the first layer. First series of characteristic data regarding a recognition target object is supplied to the signal input terminals for the quantizers of these units. In this embodiment, the first characteristic data is supplied to two component recognition units. In each one of the component recognition units n11 and n12 of the first layer, the quantizer quantizes the first characteristic data and outputs a quantization result to the load applier 813d0. The load applier 813d0 sets a load which corresponds to preliminarily set input data and a load of an adjacent section at associated quantization level positions. A plurality of paths are selected in this manner in one component recognition unit, and the path input terminals of component recognition units n21 to n24 of the second layer are provided with values which are obtained by multiplying the path signals and the loads. Second characteristic data regarding the recognition target object read from a learning data storage part 224 is supplied to the signal input terminals of the component recognition units of the second layer. In a similar manner to that in the first layer, a plurality path signals are selected and values obtained by multiplying the path signals and the loads are supplied to the path input terminals of the component recognition units n31 to n38 of the third layer. During the forward processing, teaching data is not supplied to the path input terminals of component recognition units n31 to n38 of the third layer. Hence, the loads are not changed but rather the loads are maintained as they were during learning. These loads are multiplied on the path input signals of the respective component recognition units and the path signals are supplied to the path input terminals of all component recognition units of the fourth layer. The adder 92 of each threshold value processing unit 9 of the fourth layer adds up the path signals input thereto. The threshold value processor 93 processes the path signal by threshold processing and outputs the processed signal to the path output part 94. A function used in threshold processing may be a sigmoid function or a step function, for instance. Based on the characteristic data of the input recognition target object, outputs of the threshold value processing units of the last layer are calculated using associated loads and output to the maximum component detector 2232. The maximum component detector 2232 detects the unit number of the unit which outputs the largest value so that the recognition result output part 2233 outputs the unit number.

Figure 16:
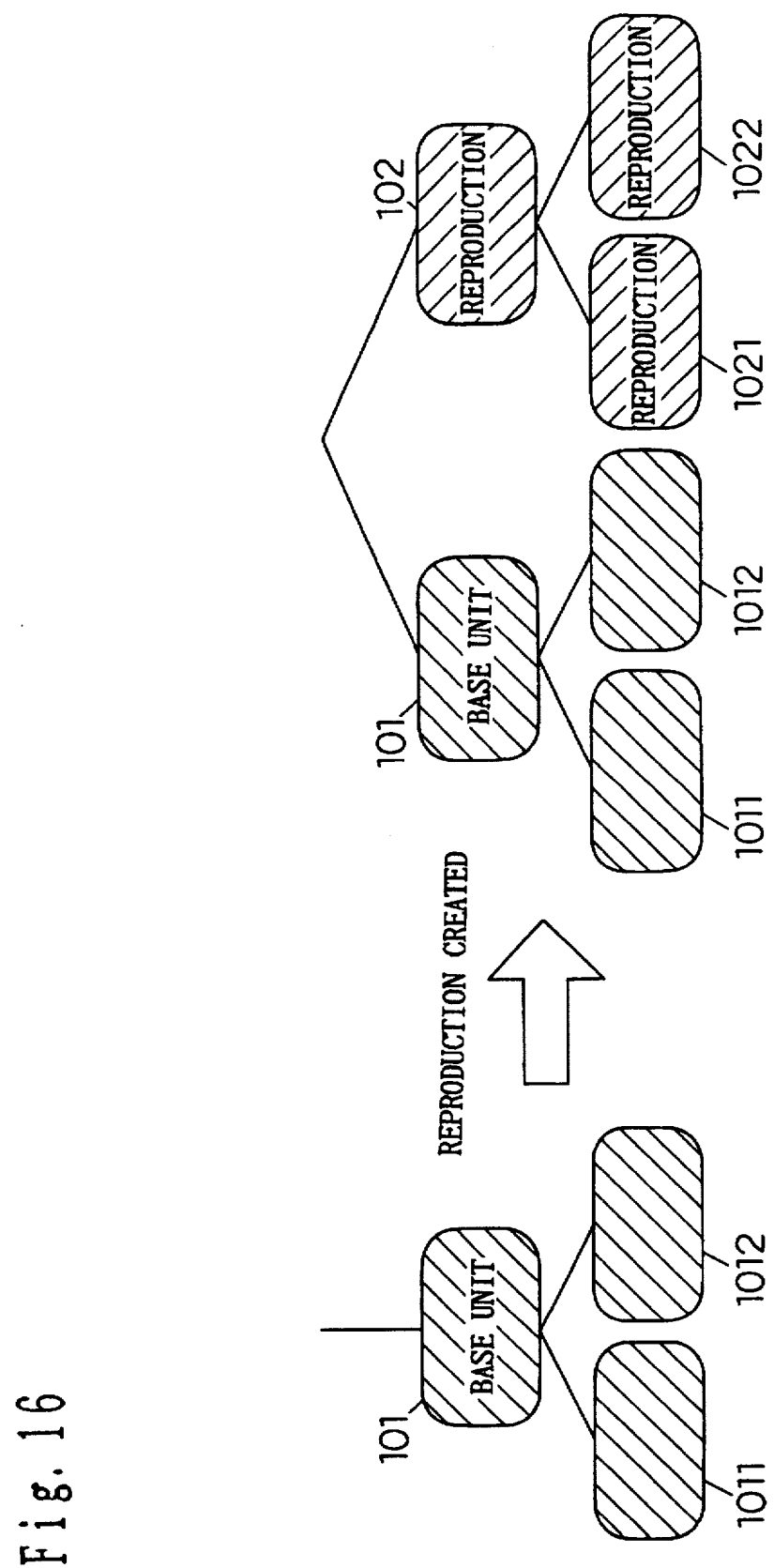
FIG. 16 is a view showing a reproducing operation of the network performed by the learning type image division judging part or the non-linear gradation correction curve selecting part during learning.

Now, the reproduction processing will be described. First, an operation of creating a reproduction of a component recognition unit will be described with reference to FIG. 8(a). For actual creation of a reproduction, it is necessary to prepare a vacant component recognition unit which is not linked to other component recognition units at all. A signal whose value ranges between 1 to 10, for example, is input at the signal input terminal 811a of the signal input part 811 of a reproduction target component recognition unit which is to be reproduced. The quantization range of the quantizer 812 is set between 1 and 10. The inner state memory part 83 calculates and stores the average, the dispersion and the number of serially input data signals every time the data signal is supplied. When a product of the number of inputting and the dispersion of the data signal exceeds a certain value, the reproduction creating part 84 copies information regarding its own component recognition unit to a vacant component recognition unit and creates a reproduction which is exactly the same as its own component recognition unit including linkage to other component recognition units, while referring to the quantization range of the quantizer, the number of quantization and the number of the path input terminals and the path output terminals of the path selector 813 which are stored in the structure memory part 82. When creating the reproduction, the reproduction creating part 84 halves the required quantization range of 1 to 10 so that the quantization range of the quantizer of the base component recognition unit is set as 1 to 5 and the quantization range of the quantizer of the reproduced component recognition unit is set as 6 to 10, for example, and therefore that the functions are divided between the base unit and the reproduced unit. Next, a description will be given on an operation of the learning type non-linear gradation correction curve selecting part 41 as a whole during creation of reproductions by the respective component recognition units. When the component recognition units of each layer down to the fourth layer create reproductions, it is necessary to create reproductions including all of the component recognition units which are linked in the lower layer. FIG. 16 shows reproduction including all of the component recognition units which are linked in the lower layer. As described before, the reproduction creation detecting part 2231 detects all component recognition units which started reproducing and outputs an instruction which requires to create reproductions including all of the component recognition units which are linked to the lower layer. For instance, as shown in FIG. 16, a unit 101 creates a reproduction including component recognition units 1011 and 1012 which are linked in the lower layer, whereby a reproduced component recognition unit 102 and depending component recognition units 1021 and 1022 are created. Hence, not only the network with respect to input data has been learned, but rather it is possible to automatically change and construct the structure of the network appropriately in accordance with an input signal and to self-organize the network structure.

The load change processing during learning will be now described. First, the learning data storage part 224 outputs teaching data which corresponds to currently input characteristic data to the signal input terminals of the component recognition units of the third layer. The teaching data expresses which one of component recognition units n41 to n4m should preferably has the largest value. The quantizers of the component recognition units n31 to n38 are set so that a quantization level value (quantization result) corresponds to a path which is linked to the component recognition unit n41 when the unit n41, for instance, outputs the largest value among the component recognition units of the fourth layer. The comparison judging part 2234 compares the recognition result with the teaching data. If the result and the data are different from each other, the learner 813d4 increases the load, which expresses the linkage strength between the path input terminal 813a1 and the path output terminal indicated by the output from the quantizer 812 (namely the path which is linked to the component recognition unit n41 in this case), by the value which is input at the path input terminal 813a1. The learning operation as described above is repeated until the recognition result of the forward processing coincides with the teaching data in this manner for all of the input data.

Now, the recognition operation will be described. First, during the recognition process, the inner state of a component recognition unit which is stored in the inner state memory part does not change, and therefore, the reproduction creating part does not operate. As in the forward processing during learning, the component recognition units of the first, the second and the third layers output signals to the next layer while applying loads on the signals transmitted to the respective paths so that outputs of the threshold value processing units of the last layer are calculated. The maximum component detector 2232 detects the unit number (n41 to n4m) of the unit which outputs the largest value and the recognition result output part 2233 outputs the unit number as the recognition result.

Thus, during the learning operation of the learning type non-linear gradation correction curve selecting part 41, the recognition results are calculated by the forward processing on the multi-layer hierarchic network. When the recognition results are false recognition, learning is achieved only by causing the learner 813d4 to increase the load upon the component recognition units of the third layer by the value which is transmitted to the path input terminal 813a1. Hence, it is not necessary to change the loads upon all component recognition units and therefore learning is fast. In addition, since the reproduction creating part 84 operates to create a reproduction of each component recognition unit when the inner state of each component recognition unit changes in response to input data, it is possible to automatically change and construct the structure of the network appropriately in accordance with the input signal and to self-organize the network structure. This means an excellent ability to deal with new data input which has not yet been learned.

Figure 17A:
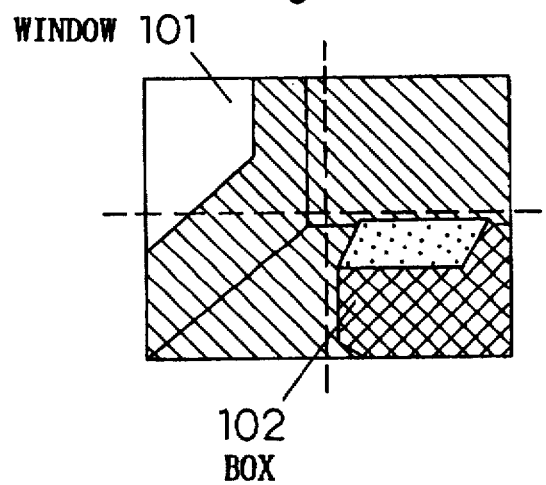
FIG. 17(a) is a view of an original image in image processing according to the present invention.
Figure 17B:
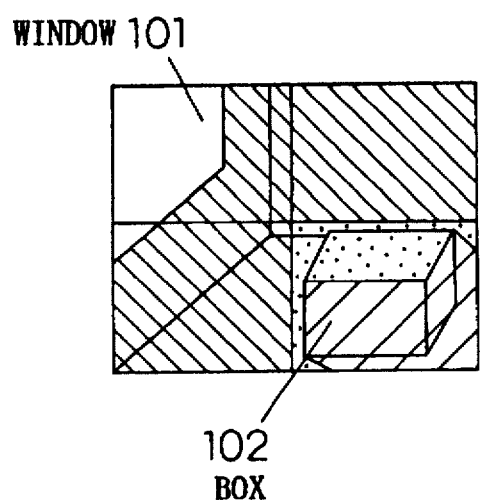
FIG. 17(b) is a view of an image in which an edge of a box located in a shadow region is enhanced.
Figure 17C:
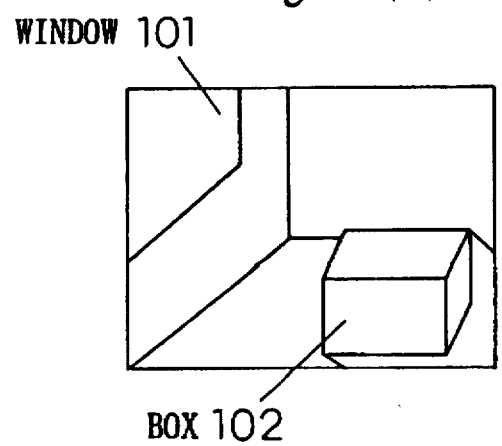
FIG. 17(c) is a view showing a result of edge extraction performed after gradation correction.

A specific example of image processing in the embodiment heretofore described will be described with reference to FIG. 17. FIG. 17(a) shows an original image. The image was recorded focusing on a window 101. The room looks very dark so that a box 102 located in a shadow region cannot be clearly recognized. This image is divided into four image blocks of the same size by the image dividing means 2. The image block of the lower right portion looks generally dark so that an edge of the box 102 cannot be clearly recognized. This image block is generally brightened as shown in FIG. 17(b) to emphasize the edge of the box 102 which is located in the shadow region. FIG. 17(c) shows a result of edge extraction performed on the respective image blocks after gradation correction (FIG. 17(b)). As described earlier, since gradation correction is performed on the lower right image block to emphasize the edge of the box 102, when edge extraction is performed on such image blocks, the edge in the shadow portion is correctly extracted as shown in FIG. 17(c).

Thus, if an image is divided into a plurality of blocks and gradation correction suitable to each block is performed before edge extraction, a bright region is left as it is while a dark region is brightened, thereby correctly extracting edges from both the bright region and the dark region.

[Embodiment 2]

Figure 18:
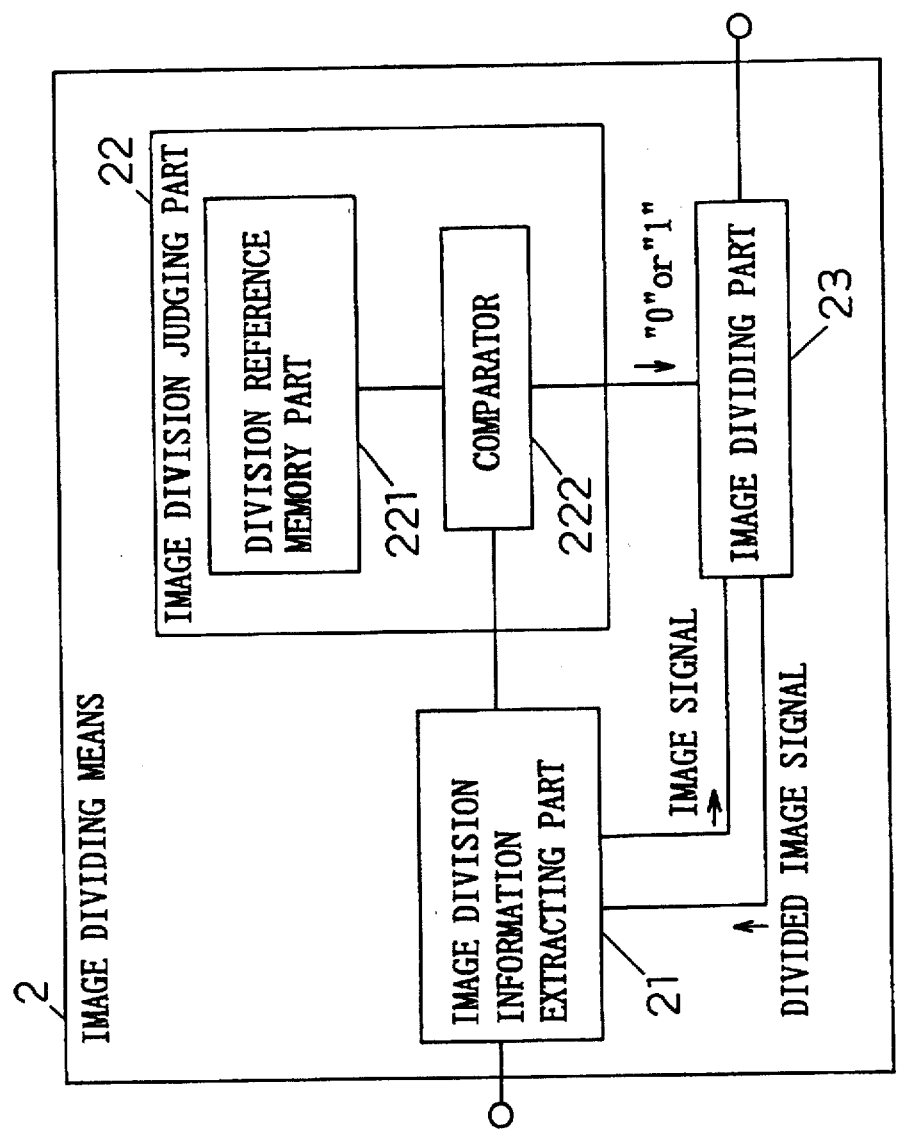
FIG. 18 is a block diagram showing a first embodiment of an image dividing means of the present invention.

A second embodiment of an image processing apparatus according to the present invention will be now described. FIG. 18 is a block diagram showing the image dividing means 2 of the second embodiment. The second embodiment is different from the first embodiment in that the image dividing means 2 of FIG. 11(a) is constructed as shown in FIG. 18. The second embodiment is otherwise similar in structure to the first embodiment. The image dividing means 2 is formed by an image division information extracting part 21 for extracting one type or a plurality types of division information which is used as a reference in dividing an input image or an image block, an image division judging part 22, which judges whether to divide a target image or image block based on division information obtained by the image division information extracting part 21 and outputs "1" if division is to be performed but "0" if division is not to be performed, and an image dividing part 23 which divides an image in response to "1" output from the image division judging part 22 to send divided images back to the image division information extracting part 21 again but does not divide an image if an output from the image division judging part 22 "0" so that an undivided image is supplied to the image correction information extracting means 3. The image division judging part 22 is formed by a division reference memory part 221 which stores division reference values (threshold values) which correspond to each division information received from the image division information extracting part 21 and a comparison part 222 which compares one type or a plurality types of division information obtained by the image division information extracting part 21 with the division reference values each corresponding to each division information stored in the division reference memory part 221 and which outputs "1" to the image dividing part 23 if the each division information satisfies a condition of division but "0" to the image dividing part 23 if the each division information does not satisfy the condition of division.

An operation of the present embodiment will be described. As in the first embodiment, an image signal expressing one image page (which measures Y×X) input through the image input means 1 shown in FIG. 11(a) is supplied to the image division information extracting part 21 of the image dividing means 2. From an image signal, the image division information extracting part 21 extracts one type or a plurality types of division information which serves as a reference to judge whether a target image is to be divided, and thereafter supplies the image signal to the image dividing part 23 while supplying division information to the image division judging part 22. Based on the division information received from the image division information extracting part 21, the image division judging part 22 judges whether it is needed to divide the target image. The one type or a plurality types of the division information obtained by the image division information extracting part 21 is supplied to the comparison part 222. The comparison part 222 compares the division information received from the image division information extracting part 21 with a division reference value (threshold value) which is stored in the division reference memory part 221 and which corresponds to each division information received from the image division information extracting part 21, and outputs "1" if each division information satisfies the condition of division but "0" if not to the image dividing part 23.

Referring to FIG. 12, the reference of image division will be described.

The state of a target image may be in principle (a) a monotonous image, (b) an image which is generally divided into two luminance groups of the same luminance or (c) a complex image. If the image falls upon the category (a), the image is likely to be an image portion where an edge needs not be extracted such as a background and an inner portion of a certain region. If the image falls upon the category (b), it is likely that an edge can be accurately extracted from the image as it is or after performing one type of gradation correction on the image. Hence, if the target image is in the condition (a) or (b), the image needs not be divided further.

On the other hand, if the target image is in the condition (c), it is necessary to repeat image division until the condition (a) or (b) is realized. Considering this, the image division judging part 22 judges which one of the conditions (a), (b) and (c) corresponds to the target image and outputs "0" if the condition (a) or (b) does but "1" if the condition (c) does to the image dividing part 23. As the division information used for judgement, for example, the luminance of each pixel within the image is found and a histogram of the luminance, a histogram expressing differences in luminance between adjacent pixels, the dispersion, frequency components or the like are calculated. If the output from the image division judging part 22 is "1" the image dividing part 23 divides the target image from the image division information extracting part 21 into four image blocks (each measuring Y/2 in vertical direction and X/2 in a horizontal direction) and supplies image signals of the respective image blocks to the image division information extracting part 21. If the output from the image division judging part 22 is "0," the image dividing part 23 supplies the image to the image correction information extracting means 3 and the gradation correction means 4 without dividing the image. The same procedure is performed on an image block which is obtained by the image dividing part 23 and supplied to the image division information extracting part 21 so that extraction, judgement and division of the division information are repeated as shown in FIG. 12(d) to divide the image smaller only in a region where such is necessary. When outputs from the image division judging part 22 to the image dividing part 23 all become "0," the image division process is ended. The image and correction information extracting means 3 extracts correction information which serves as a reference for determination of the type of gradation correction from the image signals (which do not have a fixed value) regarding the respective image blocks which are divided properly by the image dividing means 2. The rest of the operations are similar to those in the first embodiment.

As described above, in the image processing apparatus according to this embodiment, as pre-processing, an image is properly divided depending on the state of the image and gradation correction suitable to each image block is performed before edge extraction. Correction suitable to a detailed condition of the image is performed, and therefore, an accurate edge image is obtained to detail.

[Embodiment 3]

Figure 19:
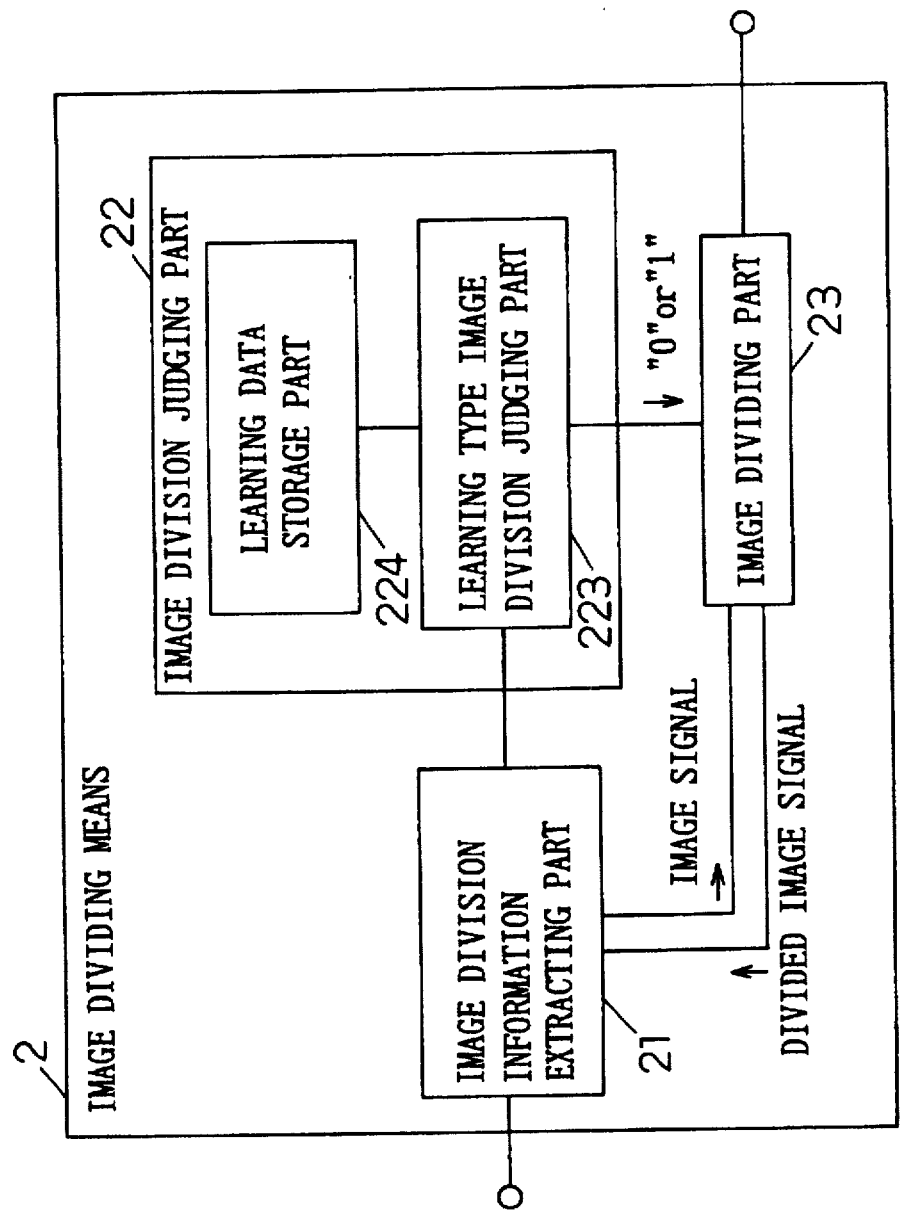
FIG. 19 is a block diagram showing a second embodiment of an image dividing means of the present invention.

A third embodiment of an image processing apparatus according to the present invention will be now described. The third embodiment is different from the first and the second embodiments in that the image division judging part 22 of FIG. 18 is constructed as shown in FIG. 19. The third embodiment is otherwise similar in structure to the second embodiment.

Referring to FIG. 19, the image division judging part 22 is formed a learning type image division judging part 223 which establishes by learning a relationship between division information corresponding to each state and the necessity of image division ("0" and "1") and a learning data storage part 224 which stores data which is used for learning. The remaining structure is similar to that shown in FIG. 18.

An operation of the present embodiment will be described. As in the first and the second embodiments, an image signal expressing one image page (which measures Y×X) input through the image input means 1 shown in FIG. 4(a) is supplied to the image division information extracting part 21 of the image dividing means 2 (See FIG. 19). From an image signal, the image division information extracting part 21 extracts one type or a plurality types of division information which serves as a reference to judge whether a target image is to be divided, and thereafter supplies the image signal to the image dividing part 23 while supplying division information to the learning type image division judging part 223 of the image division judging part 22. The learning type image division judging part 223, which had already learned a relationship between division information corresponding to each state and the necessity of image division ("0" and "1") based on data which is stored in the learning data storage part 224, judges division information in accordance with learning results and outputs "1" (division needed) or "0" (division not needed) to the image dividing part 23. The processing beyond this on the image supplied to the image dividing part 23 is similar to that of the second embodiment. The learning type image division judging part 223, having a structure which is similar to that of the learning type non-linear gradation correction curve selecting part 41 described before, performs proper image division in accordance with the condition of the image. It is to be noted that if the structure shown in FIG. 10 is used for the learning type image division judging part 223, two types of characteristic information should be input and there should be two solutions for judgement, i.e., "1" expressing Division Needed and "0" expressing Division Not Needed.

As described above, like the second embodiment, as pre-processing before edge extraction, the third embodiment requires to divide an image properly in accordance with the state of the image and perform suitable gradation correction on each image block. Further, the learning type image division judging part 223 realizes fast learning and recognition, thereby eliminating the need for a user to determine a relationship between division information obtained from an image and the necessity of image division through trial and error. Hence, it is possible to determine whether to perform image division very easily and appropriately depending on the condition of the image.

Figure 20A:
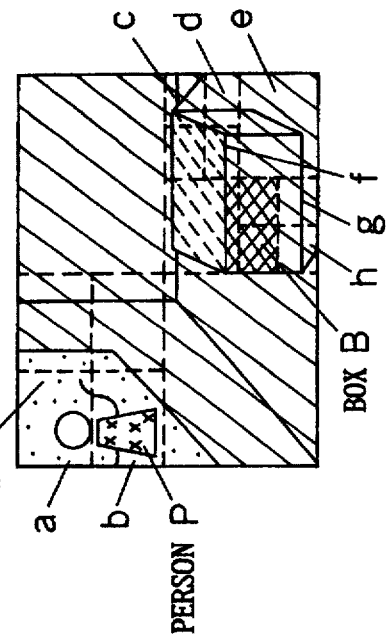
FIG. 20(a) is a view showing an original image as it is divided through image processing according to a second or a third embodiment.
Figure 20B:
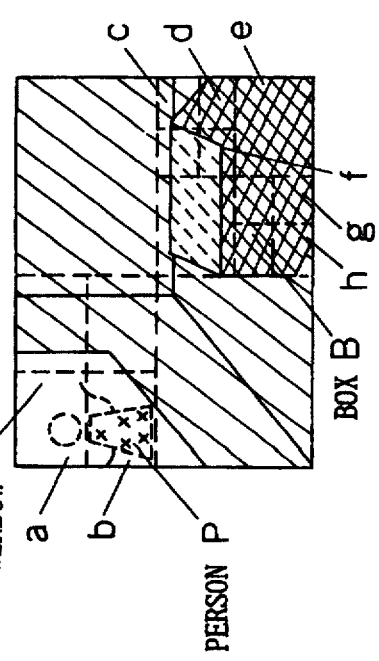
FIG. 20(b) is a view showing an image as it is with an edge enhanced by performing gradation correction on divided image blocks.
Figure 20C:
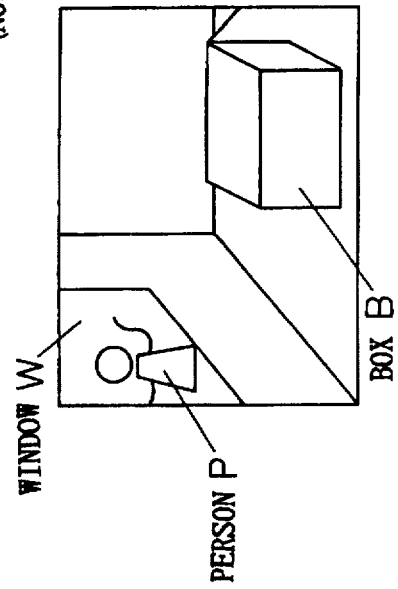
FIG. 20(c) is a view showing a result of edge extraction performed on an image of FIG. 20(b) by an edge extracting means of FIG. 2(a)
Figure 20D:
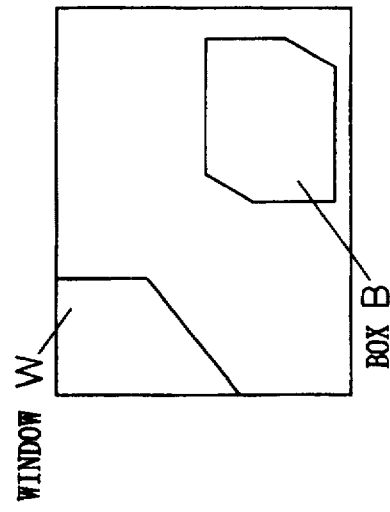
FIG. 20(d) is a view showing a result of edge extraction performed on an image of FIG. 20(b) by an edge extracting means of FIG. 2(b).

Specific examples of image processing in the second and the third embodiments will be described with reference to FIG. 20. FIG. 20(a) shows a state where an original image is divided properly by the image processing of the second and the third embodiments. This image was recorded focusing on a window W. The room looks very dark so that a box B located in a shadow region cannot be clearly recognized. This image is divided into a plurality of image blocks by the image dividing means 2. The image blocks c to h look generally dark. The image blocks a and b look generally bright so that edges of the box B and a person P cannot be clearly recognized. The image blocks c to h are generally brightened while the luminance of the image blocks a and b is generally suppressed to increase a difference in luminance as shown in FIG. 20(b), whereby the edges of the box B and the person P are enhanced. FIGS. 20(c) and 20(d) show results of edge extraction performed on the respective image blocks after gradation correction (FIG. 20(b)). As described earlier, FIG. 20(c) shows a result of conventional edge extraction performed on the image of FIG. 12(a) while FIG. 20(d) shows a result of conventional edge extraction performed on the image of FIG. 12(b). Since the edges of the box B and the person P are enhanced by performing gradation correction on the upper left and the lower right image blocks, when edge extraction is performed on these image blocks, edges in the shadow region are accurately extracted as shown in FIGS. 20(c) and 20(d). Thus, if an image is divided depending on a need until only one type of gradation correction becomes sufficient for each divided image and gradation correction suitable to each image block is performed, edges are accurately extracted in detail.

As described above, the image processing apparatus of the present invention is characteristic in that non-linear gradation correction is performed as pre-processing prior to conventional edge extraction. This improves the dynamic range of an image so that it is possible to extract an edge which cannot be extracted by a conventional technique such as an edge of an object existing in a shadow region.

Fixed gradation correction is not preformed on each image. Rather, an image region is divided into a plurality of blocks, and a non-linear gradation correction curve which is suitable to each block is selected and gradation correction is performed. Hence, the image is corrected appropriately in accordance with the conditions in fine regions. From corrected images, even more accurate edge image is obtained.

Further, the learning type image division judging part and the learning type non-linear gradation correction curve selecting part realize fast learning and recognition so that it is not necessary for a user to determine division information, a manner in which the image should be divided and a relationship between the division information and a non-linear gradation correction curve through trial and error.

Figure 4B:
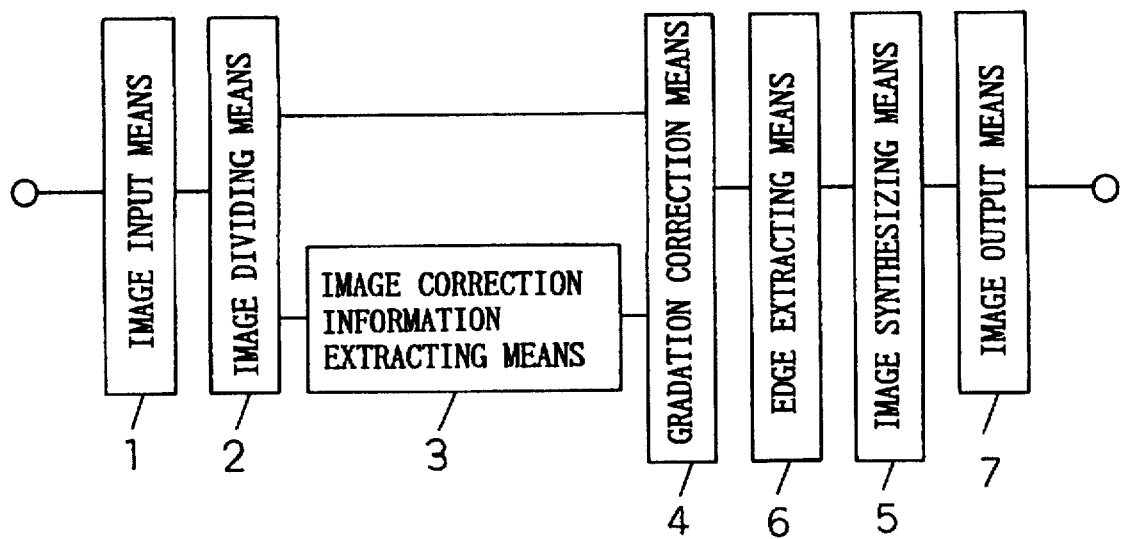
FIG. 4(b) is a block diagram of another embodiment of an image processing apparatus according to the present invention.

Although the embodiments above require to synthesize an image and extract an edge from a synthesized image after dividing the image and performing gradation correction which is suitable to each image block, the image may be synthesized after extracting an edge from each corrected image block as shown in FIG. 4(b). That is, the image processing apparatus is formed by an image input means 1 for receiving an image frame/field; an image dividing means 2 for dividing the image frame/field into a certain number of image blocks; an image correction information extracting means 3 for extracting at least one type of image information which serves as a reference of gradation correction from an image signal corresponding to each of the image blocks; a gradation correction means 4 for performing pretreatment for gradation correction of the image signal corresponding to each of the image blocks in consideration of the image information; an edge extracting means 6 for extracting an edge image from the image signal which is pretreated by the gradation correction means 4; an image synthesizing means 5 for synthesizing an edge frame/field by using the edge images each of which is extracted by the edge extracting means 6; and an image output means 7 for outputting the edge frame/field.

The respective means used in the present invention may be realized as software on a computer, or may be realized using special hardware circuits which are equipped with the respective functions.

In the embodiments above, an image is adaptively divided until only one type of gradation correction becomes sufficient for each divided image, but the present invention is not limited to such arrangement. For example, provisions may be made so that an image is divided a prescribed times or until the pixels of each divided image becomes less than a prescribed number. Accordingly, the number of image blocks is determined by the adaptive or the predetermined division method. When an image frame/field has an image signal as shown in FIG. 12 (a) or (b), the image frame/field is not divided by the image dividing means 2.

As described above, the present invention performs pre-processing prior to edge extraction using an image dividing means for dividing an image signal expressing one image page into a plurality of image blocks, an image correction information extracting means for extracting one type or a plurality types of image information from an image signal of each image block and a gradation correction means for performing optimal gradation correction on each image block in accordance with the correction information and for enhancing an edge which is to be extracted.

The image dividing means is formed by an image division information extracting part for extracting one type or a plurality types of division information from a target image block to be divided, an image division judging part for judging whether to divide the target image block based on the division information extracted by the image division information extracting part and an image dividing part for dividing the target image block in accordance with a judgement yielded by the image division judging part. An image block obtained by image division performed by the image dividing part is supplied to the image division information extracting part. Extraction of the division information, judgement of the necessity of image division and image division are performed repeatedly, thereby making it possible to divide an image block in accordance with the state of the image. Thus, gradation correction suitable to each image block is performed and an edge is extracted accurately in detail.

When the image division judging part is formed by a division reference value memory part and a comparison part, the comparison part compares division information extracted by the image division judging part with a division reference value which is stored in the division reference value memory part and which corresponds to each division information, and outputs "1" (division needed) if each division information satisfies a condition of division but "0" (division not needed) if not to the image dividing part. An instruction is supplied to the image dividing part in this manner.

On the other hand, when the image division judging part is formed by a learning type image division judging part and a learning data memory part, the learning type image division judging part had already learned a relationship between division information corresponding to each state and the necessity of image division ("0" and "1" ) based on data which is stored in the learning data memory part. The learning type image division judging part judges division information in accordance with learning results and outputs "1" or "0" to the image dividing part, thereby instructing the image dividing part whether to perform image division. Since the learning type image division judging part had already learned the relationship between division information of an image and the necessity of image division in advance and judges each division information based on learning results, a user does not need to determine a division reference value through trial and error. Rather, it is possible to determine whether to perform image division very easily and appropriately depending on the condition of the image.

When gradation correction means is formed by a learning type non-linear gradation correction curve selecting part and a non-linear gradation correction part based on data which is stored in the learning data memory part, the learning type non-linear gradation correction curve selecting part had already learned a relationship between division information corresponding to each state and a non-linear gradation correction curve which is to be used for gradation correction. Based on learning results, the learning type non-linear gradation correction curve selecting part judges correction information which is obtained by the image correction information extracting means, and selects a non-linear gradation correction curve (or a parameter of the non-linear gradation correction curve) which is to be used for gradation correction. The non-linear gradation correction part performs gradation correction on a corrected target region using the non-linear gradation correction curve which is selected by the learning type non-linear gradation correction curve selecting part, and outputs a corrected image signal. Hence, it is not necessary for a user to determine a relationship between correction information and a non-linear gamma curve through trial and error. Thus, image processing is very simple.

What is claimed is:

1. An image processing apparatus, comprising:

image input means for receiving an image frame/field;

image dividing means for dividing said image frame/field into a certain number of image blocks;

image correction information extracting means for extracting at least one type of image information for comparison with a predetermined reference indicating the presense of a section of an edge image signal within an image block;

gradation correction means for pretreating for edge extraction in accordance with the comparison between the image information and the predetermined reference by selecting a gradation correction for each of said image blocks;

image synthesizing means for synthesizing a pretreated frame/field by using the image signals each of which is pretreated by said gradation correction means;

edge extracting means for extracting an edge image from said pretreated frame/field; and image output means for outputting said edge image.

2. An image processing apparatus, comprising:

image input means for receiving an image frame/field;

image dividing means for dividing said image frame/field into a certain number of image blocks;

image correction information extracting means for extracting at least one type of image information for comparison with a predetermined reference indicating the presense of a section of an edge image signal within an image block;

gradation correction means for pretreating for edge extraction in accordance with the comparison between the image information and the predetermined reference by selecting a gradation correction for each of said image blocks;

edge extracting means for extracting an edge image from the image signal which is pretreated by said gradation correction means;

image synthesizing means for synthesizing an edge frame/field by using the edge images each of which is extracted by said edge extracting means; and image output means for outputting said edge frame/field.

3. An image processing apparatus in accordance with claim 1, wherein the image dividing means comprises:

an image block extracting part for extracting image blocks each of which has a region of m×n pixels and image blocks each of which has a region of k×l pixels (k≦m, l≦n) with a coordinate point (x,y) within said image frame/field as a center of gravity and for supplying the image blocks each of which has a region of m×n pixels to said image correction information extracting means while supplying the image blocks each of which has a region of k×l pixels to said gradation correction means;

a center of gravity setting part for calculating the center of gravity for the image blocks to be extracted next by said image block extracting part;

the center of gravity of said image block extracting part being renewed by the center of gravity which is calculated by said center of gravity setting part; and a process of said image block extracting part being repeatedly performed.

4. An image processing apparatus in accordance with claim 2, wherein the image dividing means comprises:

an image block extracting part for extracting image blocks each of which has a region of m×n pixels and image blocks each of which has a region of k×l pixels (k≦m, l≦n) with a coordinate point (x,y) within said image frame/field as a center of gravity and for supplying the image blocks each of which has a region of m×n pixels to said image correction information extracting means while supplying the image blocks each of which has a region of k×l pixels to said gradation correction means;

a center of gravity setting part for calculating the center of gravity for the image blocks to be extracted next by said image block extracting part;

the center of gravity of said image block extracting part being renewed by the center of gravity which is calculated by said center of gravity setting part; and a process of said image block extracting part being repeatedly performed.

5. An image processing apparatus in accordance with claim 1, wherein said certain number of image blocks is one image block or a plurality of image blocks, and wherein said image dividing means comprises:

an image division information extracting part for extracting at least one type of division information which serves as a reference of image division from a target image, an image division judging part for determining whether to divide said target image in consideration of said division information, and an image dividing part for dividing the target image into image blocks in accordance with a judgment yielded by said image division judging part, said target image being said image frame/field or the image blocks which are divided by said image dividing part.

6. An image processing apparatus in accordance with claim 2, wherein said certain number of image blocks is one image block or a plurality of image blocks, and wherein said image dividing means comprises:

an image division information extracting part for extracting at least one type of division information which serves as a reference of image division from a target image, an image division judging part for determining whether to divide said target image in consideration of said division information, and an image dividing part for dividing the target image into image blocks in accordance with a judgment yielded by said image division judging part, said target image being said image frame/field or the image blocks which are divided by said image dividing part.

7. An image processing apparatus in accordance with claim 5, wherein said image dividing means repeats a process of said image division information extracting part, said image division judging part and said image dividing part a certain times.

8. An image processing apparatus in accordance with claim 6, wherein said image dividing means repeats a process of said image division information extracting part, said image division judging part and said image dividing part a certain times.

9. An image processing apparatus in accordance with claim 5, wherein said image division judging part comprises:
- a division reference value memory part for storing division reference values corresponding to said division information; and
- a comparison part for comparing said target image with each of said division reference values and for outputting "1" in case of division needed or "0" in case of division not needed to said image dividing part.

10. An image processing apparatus in accordance with claim 6, wherein said image division judging part comprises:
- a division reference value memory part for storing division reference values corresponding to said division information; and
- a comparison part for comparing said target image with each of said division reference values and for outputting "1" in case of division needed or "0" in case of division not needed to said image dividing part.

11. An image processing apparatus in accordance with claim 5, wherein said image division judging part comprises:
- a learning type image division judging part for establishing a relationship between said division information and a necessity of division through learning and for determining whether to divide said target image on basis of said division information and a result which is obtained by establishing said relationship; and
- a learning data memory part for storing combinations of said division information (characteristic data signals) and said necessity of division ("1" or "0") as data which is used for said learning.

12. An image processing apparatus in accordance with claim 6, wherein said image division judging part comprises:
- a learning type image division judging part for establishing a relationship between said division information and a necessity of division through learning and for determining whether to divide said target image on basis of said division information and a result which is obtained by establishing said relationship; and
- a learning data memory part for storing combinations of said division information (characteristic data signals) and said necessity of division ("1" or "0") as data which is used for said learning.

13. An image processing apparatus in accordance with claim 11, wherein component recognition units are combined in a multi-layer hierarchic structure to form a network, and a threshold value processing unit is disposed in the bottom layer, said threshold value processing unit is formed by at least a plurality of path input terminals, an adder for adding up and input signals from said path input terminals, a threshold value processor for processing an output signal from said adder by threshold value processing and a path output terminal for outputting an output of said threshold value processor, the learning type image division judging part is formed by disposing a teaching data input terminal at a signal input part of said component recognition unit located in a layer precedent to the bottom layer of said network so as to input teaching data which is stored in said learning data memory part and by disposing a characteristic data signal input terminal at a signal input part of said component recognition unit located in a layer other than the bottom layer and the layer precedent to the bottom layer so as to input a characteristic data signal which is stored in said learning data memory part, and said component recognition unit is formed by:

- a component unit formed by a signal input part, a quantizer for quantizing in accordance with an input signal supplied from said signal input part, one or a plurality of said path input terminals, a plurality of said path output terminals and a path selecting part which selectively connects said path input terminals and said path output terminals to select a path in accordance with outputs from and said quantizer;
- a structure memory part for storing the quantization range of said quantizer and the number of quantization as quantization constants;
- an inner state memory part for storing the average and the dispersion of input signals supplied to said component units and the number of inputting of the input signals as an inner state; and
- a reproduction creating part for halving said quantization range based on said inner state stored and reproducing the component unit as it was before division.

14. An image processing apparatus in accordance with claim 12, wherein component recognition units are combined in a multi-layer hierarchic structure to form a network, and a threshold value processing unit is disposed in the bottom layer, said threshold value processing unit is formed by at least a plurality of path input terminals, an adder for adding up and input signals from said path input terminals, a threshold value processor for processing an output signal from said adder by threshold value processing and a path output terminal for outputting an output of said threshold value processor, the learning type image division judging part is formed by disposing a teaching data input terminal at a signal input part of said component recognition unit located in a layer precedent to the bottom layer of said network so as to input teaching data which is stored in said learning data memory part and by disposing a characteristic data signal input terminal at a signal input part of said component recognition unit located in a layer other than the bottom layer and the layer precedent to the bottom layer so as to input a characteristic data signal which is stored in said learning data memory part, and said component recognition unit is formed by:

- a component unit formed by a signal input part, a quantizer for quantizing in accordance with an input signal supplied from said signal input part, one or a plurality of said path input terminals, a plurality of said path output terminals and a path selecting part which selectively connects said path input terminals and said path output terminals to select a path in accordance with outputs from and said quantizer;
- a structure memory part for storing the quantization range of said quantizer and the number of quantization as quantization constants;
- an inner state memory part for storing the average and the dispersion of input signals supplied to said component units and the number of inputting of the input signals as an inner state; and
- a reproduction creating part for halving said quantization range based on said inner state stored and reproducing the component unit as it was before division.

15. An image processing apparatus in accordance with claim 1, wherein the image correction information extracting means comprises:

a luminance extracting part for extracting a luminance signal from the image signal corresponding to each of said image blocks;

a certain number of luminance level comparators for comparing said luminance signal with a level value having a certain range so as to output "1" or "0"; and a certain number of counters for counting outputs from said luminance level comparators.

16. An image processing apparatus in accordance with claim 2, wherein the image correction information extracting means comprises:

a luminance extracting part for extracting a luminance signal from the image signal corresponding to each of said image blocks;

a certain number of luminance level comparators for comparing said luminance signal with a level value having a certain range so as to output "1" or "0"; and a certain number of counters for counting outputs from said luminance level comparators.

17. An image processing apparatus in accordance with claim 1, wherein the gradation correction means comprises:

a learning type non-linear correction curve selecting part for establishing through learning a relationship between said image information and a non-linear correction curve or a non-linear gamma curve which is to be used for gradation correction, judging said image information on basis of said learning and selecting said non-linear correction curve or said non-linear gamma curve; and non-linear correction part for correcting the image signal corresponding to each of said images blocks by using the non-linear correction curve or the non-linear gamma curve selected by said learning type non-linear correction curve selecting part.

18. An image processing apparatus in accordance with claim 2, wherein the gradation correction means comprises:

a learning type non-linear correction curve selecting part for establishing through learning a relationship between said image information and a non-linear correction curve or a non-linear gamma curve which is to be used for gradation correction, judging said image information on basis of said learning and selecting said non-linear correction curve or said non-linear gamma curve; and non-linear correction part for correcting the image signal corresponding to each of said images blocks by using the non-linear correction curve or the non-linear gamma curve selected by said learning type non-linear correction curve selecting part.

19. An image processing apparatus in accordance with claim 17, wherein component recognition units are combined in a multi-layer hierarchic structure to form a network, and a threshold value processing unit is disposed in the bottom layer, said threshold value processing unit is formed by at least a plurality of path input terminals, an adder for adding up input signals from said path input terminals, a threshold value processor for processing an output signal from said adder by threshold value processing and a threshold value processing unit for outputting an output of said threshold value processor, and said component recognition unit is formed by:

a component unit formed by the learning type non-linear correction curve selecting part which is formed by disposing a teaching signal input terminal at a signal input part of said component recognition unit located in a layer precedent to said bottom layer of said network so as to input a teaching signal, said signal input part, the quantizer for quantizing in accordance with an input signal from said signal input part, one or a plurality of said path input terminals, one or a plurality of said path output terminals and a path selector for selectively connecting said path input terminals and said path output terminals to select a path in accordance with an output from said quantizer;

a structure memory part for storing the quantization range of said quantizer and the number of quantization as quantization constants;

an inner state memory part for storing the average and the dispersion of input signals supplied to said component units and the number of inputting of the input signals as an inner state; and a reproduction creating part for halving said quantization range based on said inner state stored and reproducing the component unit as it was before division.

20. An image processing apparatus in accordance with claim 18, wherein component recognition units are combined in a multi-layer hierarchic structure to form a network, and a threshold value processing unit is disposed in the bottom layer, said threshold value processing unit is formed by at least a plurality of path input terminals, an adder for adding up input signals from said path input terminals, a threshold value processor for processing an output signal from said adder by threshold value processing and a threshold value processing unit for outputting an output of said threshold value processor, and said component recognition unit is formed by:

a component unit formed by the leaning type non-linear correction curve selecting part which is formed by disposing a teaching signal input terminal at a signal input part of said component recognition unit located in a layer precedent to said bottom layer of said network so as to input a teaching signal, said signal input part, the quantizer for quantizing in accordance with an input signal from said signal input part, one or a plurality of said path input terminals, one or a plurality of said path output terminals and a path selector for selectively connecting said path input terminals and said path output terminals to select a path in accordance with an output from said quantizer;

a structure memory part for storing the quantization range of said quantizer and the number of quantization as quantization constants;

an inner state memory part for storing the average and the dispersion of input signals supplied to said component units and the number of inputting of the input signals as an inner state; and a reproduction creating part for halving said quantization range based on said inner state stored and reproducing the component unit as it was before division.

21. An image processing method for producing an edge image, said edge image defining edges within one of an image frame and an image field, comprising the steps of:

a) receiving one of said image frame and said image field;

b) dividing said one of said image frame and said image field into a selected number of image blocks, each of said image blocks having a corresponding image signal and a corresponding gradation;

c) extracting at least one type of image information from said image signal for comparison with a predetermined reference indicating a presense of a section of an edge image within an image block;

d) correcting gradation by
1) selecting a correction of gradation for each image signal in accordance with the comparison between the predetermined reference and said image information, and
2) pretreating each image signal for edge extraction responsive to the selected gradation correction;

e) synthesizing a pretreated image by using the pretreated image signals; and f) extracting the edge image from said pretreated image.

22. An image processing method for producing an edge image, said edge image defining edges within one of an image frame and an image field, comprising the steps of:

a) receiving one of an image frame and an image field;

b) dividing said one of said image frame and said image field into a selected number of image blocks, each of said image blocks having a corresponding image signal and a corresponding gradation;

c) extracting at least one type of image information from said image signal for comparison with a predetermined reference indicating a presense of a section of an edge image within an image block;

d) correcting gradation by
1) selecting a correction of gradation for each image signal in accordance with the comparison between the predetermined reference and said image information, and
2) pretreating each image signal for edge extraction responsive to the selected gradation correction;

e) extracting an edge signal from each of said pretreated image signals; and f) synthesizing the edge image from each of said edge signals extracted by said edge extracting means.

23. An image processing method in accordance with claim 21 or claim 22, wherein the dividing step (b) further comprises the steps of:

1) targeting one of an image frame and an image field to define a targeted image;
2) determining, based on information in the targeted image, whether the targeted image should be divided, and
i) if no, then the targeted image forms one image block,
ii) if yes, then divide the targeted image into at least two divided images, and successively target each one of the divided images as the defined targeted image; and
3) repeating step (3) until all of the image blocks have been formed into the selected number of image blocks.

24. An image processing method in accordance with claim 21 or claim 22, wherein the dividing step (b) further comprises the steps of:

1) selecting each of the image blocks by defining a respective center of gravity;
2) defining a region for each selected image block, the region being one of a first type and of a second type;
3) processing by step (c) each image block having a region of the first type; and
4) processing by step (d) each image block having a region of the second type.

25. An image processing method in accordance with claim 21 or claim 22, wherein the extracting step (c) further comprises the steps of:

1) extracting a luminance signal from the image signal corresponding to each one of said image blocks; and
2) determining a luminance level value of each luminance signal, wherein the luminance level value is one type of image information.

26. An image processing method in accordance with claim 21 or claim 22, wherein the step of correcting gradation (d)(1) further comprises the steps of:

1) providing a plurality of non-linear correction curves;
2) establishing a relationship between each one of the plurality of correction curves and the image information;
3) selecting one of the plurality of correction curves by evaluating each one of the plurality of correction curves based on the relationship; and
4) correcting the image signal in the corresponding image block according to the information in the selected correction curve.

27. An image processing system for producing an edge image, said edge image defining edges within one of an image frame and an image field, comprising:

means for receiving one of said image frame and said image field;

dividing means for dividing said one of said image frame and said image field into a selected number of image blocks, each of said image blocks having a corresponding image signal and a corresponding gradation;

image information extraction means for extracting at least one type of image information from said image signal for comparison with a predetermined reference indicating a presense of a section of an edge image within an image block;

gradation correction means:
1) for selecting a correction of gradation for each image signal in accordance with the comparison between the predetermined reference and said image information, and
2) for pretreating each image signal for edge extraction responsive to the selected gradation correction;

image synthesizing means for synthesizing a pretreated image by using the pretreated image signals; and edge image extracting means for extracting the edge image from said pretreated image.

28. An image processing system for producing an edge image, said edge image defining edges within one of an image frame and an image field, comprising:

means for receiving one of an image frame and an image field;

dividing means for dividing said one of said image frame and said image field into a selected number of image blocks, each of said image blocks having a corresponding image signal and a corresponding gradation;

image information extracting means for extracting at least one type of image information from said image signal for comparison with a predetermined reference indicating a presense of a section of an edge image within an image block;

gradation correction means
1) for selecting a correction of gradation for each image signal in accordance with the comparison between the predetermined reference and said image information, and
2) for pretreating each image signal for edge extraction responsive to the selected gradation correction;

edge signal extracting means for extracting an edge signal from each of said pretreated image signals; and edge image synthesizing means for synthesizing the edge image from each of said edge signals extracted by said edge extracting means.

* * * * *